United States Patent
Lindeskov et al.

(10) Patent No.: US 11,117,335 B2
(45) Date of Patent: Sep. 14, 2021

(54) METHOD OF MANUFACTURING COMPOSITE LAMINATE PANEL SUB-ELEMENTS FOR A MODULAR ASSEMBLY STRUCTURE, A METHOD OF ASSEMBLING THE SUB-ELEMENTS, AND A STRUCTURE ASSEMBLED OF THE PANEL SUB-ELEMENTS

(71) Applicant: JUPITER BACH A/S, Køge (DK)

(72) Inventors: Anders Froman Lindeskov, Køge (DK); Joshua Redento De Souza, København N (DK); Henrik Gaard Larsen, Tappernøje (DK); Per Johansen, Præstø (DK); Ulrik Koch Raimund, Bogø By (DK)

(73) Assignee: JUPITER BACH A/S, Køge (DK)

( * ) Notice: Subject to any disclaimer, the term of this patent is extended or adjusted under 35 U.S.C. 154(b) by 0 days.

(21) Appl. No.: 16/627,261

(22) PCT Filed: Jun. 12, 2018

(86) PCT No.: PCT/DK2018/050135
§ 371 (c)(1),
(2) Date: Dec. 27, 2019

(87) PCT Pub. No.: WO2019/034214
PCT Pub. Date: Feb. 21, 2019

(65) Prior Publication Data
US 2020/0130298 A1    Apr. 30, 2020

(30) Foreign Application Priority Data
Aug. 16, 2017   (DK) .......................... PA 201700449

(51) Int. Cl.
*B29C 70/54*   (2006.01)
*B64D 29/00*   (2006.01)
(Continued)

(52) U.S. Cl.
CPC .......... *B29C 70/545* (2013.01); *B29C 39/123* (2013.01); *B64D 29/00* (2013.01);
(Continued)

(58) Field of Classification Search
CPC ............ F05B 2230/601; F05B 2230/21; F05B 2230/24; F05B 2240/14;
(Continued)

(56) References Cited

U.S. PATENT DOCUMENTS 6,824,851 B1 * 11/2004 Locher .................. B29C 69/001
428/76
2009/0282777 A1   11/2009 Schwartau
(Continued)

FOREIGN PATENT DOCUMENTS

CN          1819813 A        8/2006
CN       103334884 A       10/2013
(Continued)

OTHER PUBLICATIONS

International Search Report, Appl. No. PCT/DK2018/050135 dated Sep. 19, 2018.
(Continued)

*Primary Examiner* — Matthew P Travers
(74) *Attorney, Agent, or Firm* — Fox Rothschild LLP

(57) ABSTRACT

A method of manufacturing composite laminate panel sub-elements (34) for subsequent assembling into a modular assembly structure (37), comprises the preprocessing steps of casting an elongate composite laminate sheet panel (18) having opposite first and second fiber-reinforced plastic face skins (19,21) sandwiching a core (35), a free first elongate edge (22) and an opposite second elongate free edge (24), demolding the elongate composite laminate sheet panel (18), cutting the demolded elongate composite laminate sheet panel (18) into (n) shorter sections (Sn), thereby providing
(Continued)

sections (Sn) with at least one free cut edge (26; 32), a free first edge (22) having the same profile as the free first elongate edge, and a free second edge (22) parallel to the free first edge and having the same profile as the free second elongate edge, and machining at least a first coupling profile (27) along the at least one free cut edge (26; 32).

22 Claims, 12 Drawing Sheets

(51) Int. Cl.
    *B29C 39/12*       (2006.01)
    *F03D 13/00*       (2016.01)
    *F03D 80/00*       (2016.01)
    *B29L 31/00*       (2006.01)
    *B32B 5/24*         (2006.01)

(52) U.S. Cl.
    CPC ......... *B29L 2031/776* (2013.01); *B32B 5/245* (2013.01); *F03D 13/00* (2016.05); *F03D 80/00* (2016.05); *F05B 2240/14* (2013.01)

(58) Field of Classification Search
    CPC .... F05B 2230/50–502; F05B 13/00–10; F05B 80/00; Y10T 29/49787; B29C 70/545; B29C 39/18; B29C 39/10; B29C 39/123; B29C 39/203; B29C 48/18; B29C 48/21; B29C 70/52; B32B 5/02; B32B 5/18; B32B 5/245; B32B 17/04; B32B 38/0004; B32B 2250/03; B32B 2250/40; B32B 2260/023; B32B 2607/00; B29L 2009/00; B29L 2031/776; E04C 2/24–246
See application file for complete search history.

(56) References Cited

U.S. PATENT DOCUMENTS

| | | | |
|---|---|---|---|
| 2010/0173118 A1* | 7/2010 | Johnson | B29C 70/086 428/86 |
| 2011/0142613 A1* | 6/2011 | Stam | F03D 13/40 415/213.1 |
| 2011/0214361 A1* | 9/2011 | Ingjaldsdottir | E04B 1/343 52/79.1 |
| 2013/0115073 A1 | 5/2013 | Thiel et al. | |
| 2015/0152881 A1* | 6/2015 | Tirumalai | F03D 13/20 415/1 |
| 2015/0328845 A1* | 11/2015 | Lockett | B29C 70/443 428/116 |
| 2018/0298609 A1* | 10/2018 | Banerjee | B32B 3/06 |

FOREIGN PATENT DOCUMENTS

| | | | | |
|---|---|---|---|---|
| CN | 105473847 A | 4/2016 | | |
| EP | 2 947 001 A1 | 12/2015 | | |
| KR | 20140067298 A | 6/2014 | | |
| WO | WO-2007132408 A2 * | 11/2007 | ............ | F03D 13/10 |
| WO | WO-2015051831 A1 * | 4/2015 | ............ | B29C 69/00 |
| WO | WO2016/028179 A1 | 2/2016 | | |

OTHER PUBLICATIONS

International Preliminary Report on Patentability, Appl. No. PCT/DK2018/050135 dated Sep. 9, 2019.
Office Action and Search Report, CN Appl. No. 201880008455.4 dated Nov. 25, 2020.

* cited by examiner

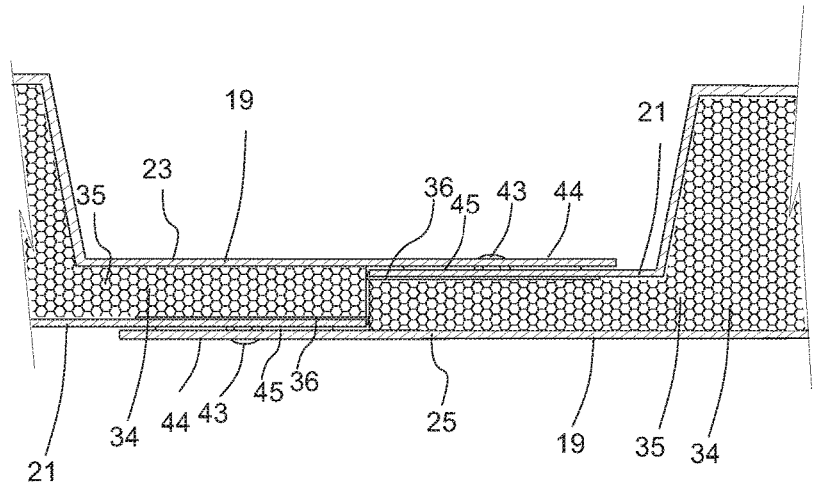
Fig. 10
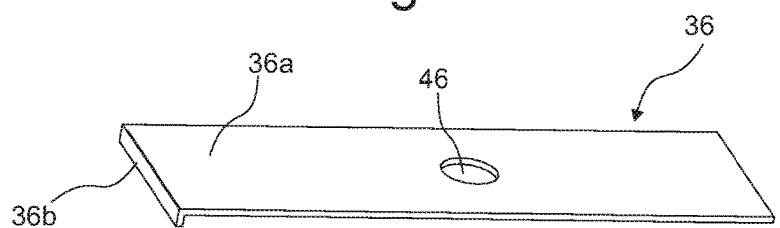
Fig. 11
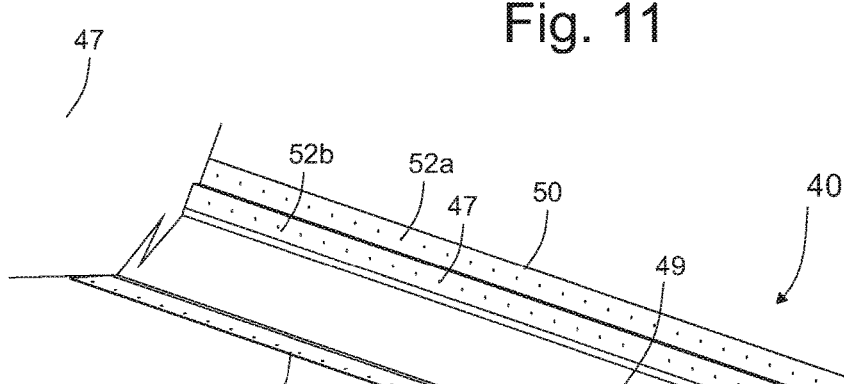
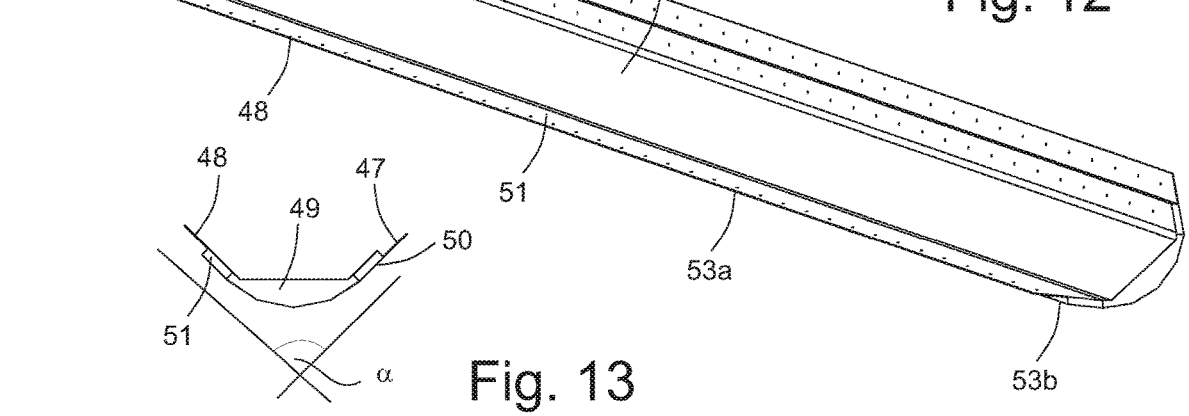
Fig. 12
Fig. 13

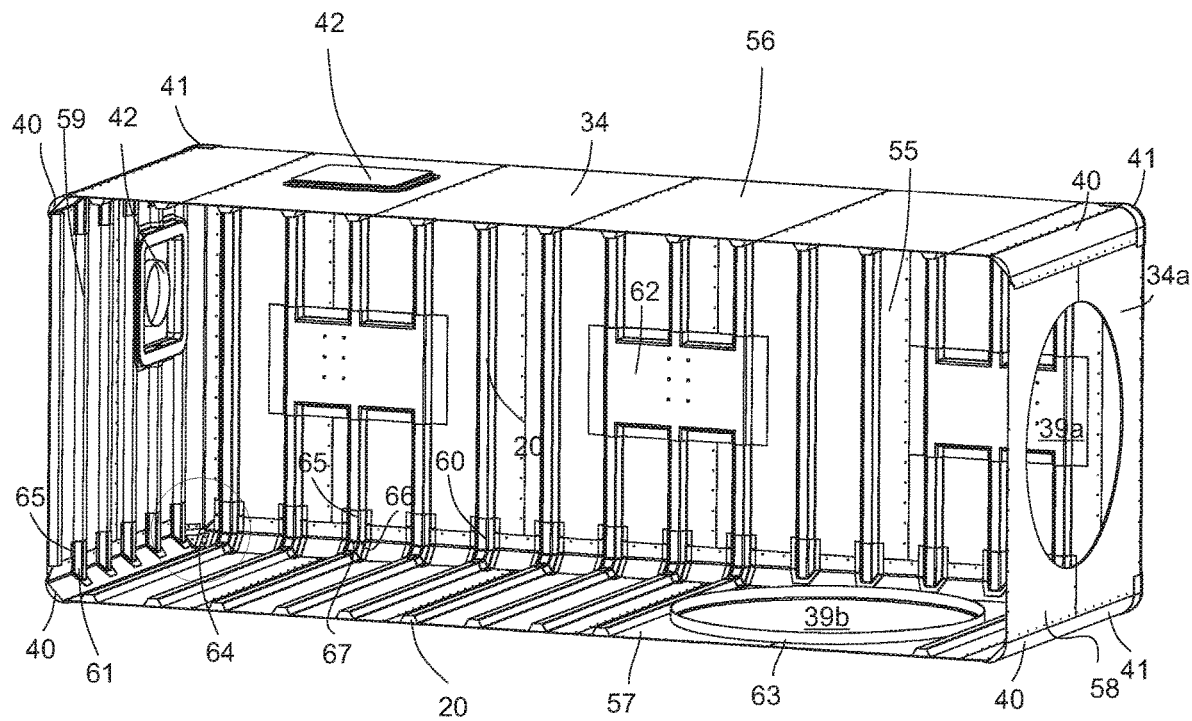
Fig. 14
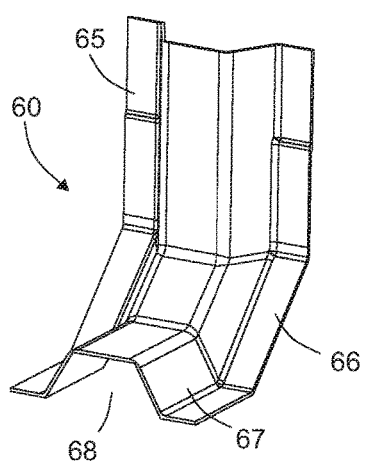 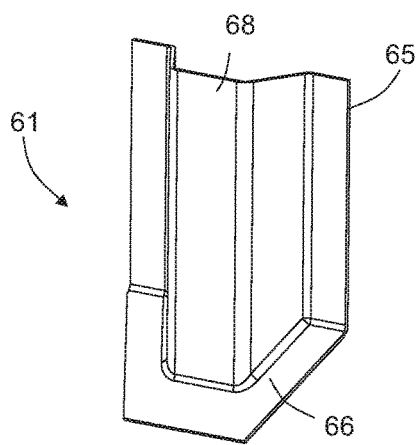
Fig. 15        Fig. 16

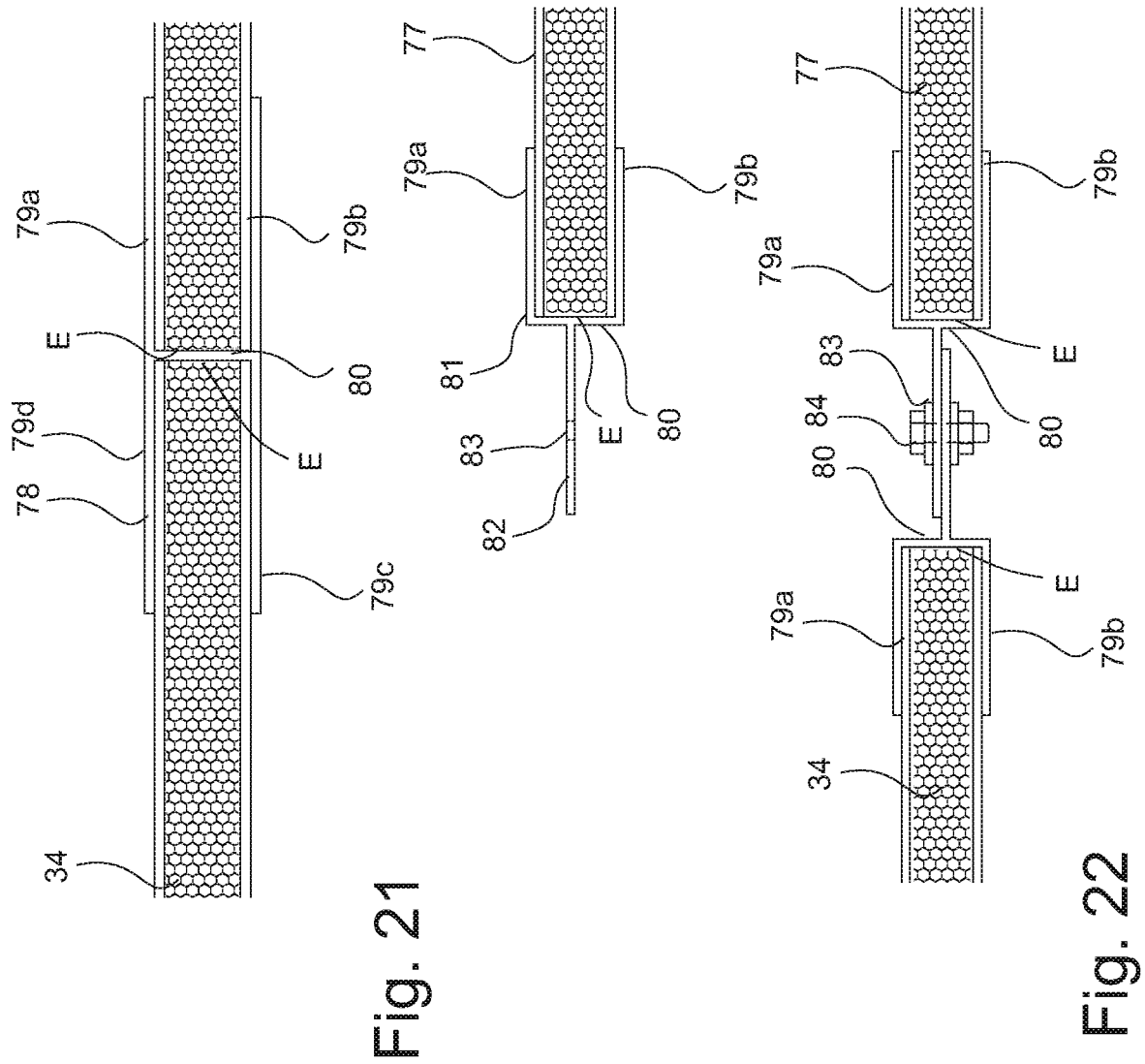

METHOD OF MANUFACTURING COMPOSITE LAMINATE PANEL SUB-ELEMENTS FOR A MODULAR ASSEMBLY STRUCTURE, A METHOD OF ASSEMBLING THE SUB-ELEMENTS, AND A STRUCTURE ASSEMBLED OF THE PANEL SUB-ELEMENTS

This application is a 371 filing of International Patent Application PCT/DK2018/050135 filed Jun. 12, 2018, which claims priority to Denmark application no. PA201700449 filed Aug. 16, 2017.

TECHNICAL FIELD

The present invention relates to a method of manufacturing composite laminate panel sub-elements for subsequent assembling into a modular assembly structure.

BACKGROUND

Within the context of the present invention the term "composite laminate" is used for a structural panel or similar construction that in its simplest form consists of two relatively thin, face skins of composite bonded to and separated by a "core", typically a lightweight core. Within the context of the present invention the "core" may be any configuration that creates a distance between the opposite face skins, and has high shear strength and compression stiffness that supports the composite face skins against buckling and resists out-of-plane shear loads. As an example of a typical composite laminate can be mentioned a fiberglass/foam sandwich laminate. A fiberglass/foam sandwich laminate is often manufactured in a vacuum process, but it can also simply be laid up by hand in a mold without application of vacuum. The fiberglass face skins can in some methods be pre-cured and subsequently bonded to the foam core. In other methods the fiberglass face skins and the foam core are co-cured in one operation. Combinations of the aforementioned methods are also known within the art of manufacturing layered composites having sandwich structure. The composite laminate can be pre-preg.

A variety of foams can be used as core material, such as polystyrene, e.g. polystyrene with a tightly closed cell structure and no voids between cells to provide high compressive strength. Another option is polyurethane (PU). Polyurethane is rather inexpensive and compatible with most adhesives. Other options include but are not limited to polypropylene (PP), which is also compatible with most adhesives and epoxy resins, but not with polyester resins; polyvinyl chloride (PVC), e.g. a closed cell medium- to high-density PVC foam with high compression strength, and durability; a closed-cell polymethacrylimide (PMMA), which has good mechanical properties as well as high dimensional stability, even when subjected to thermal changes, and outstanding creep compression resistance. The above list of chemical substances for the foam core should not be construed as exhaustive, and the person skilled in the art would we aware of alternatives.

Within the context of the present invention the term "fiber-reinforced" means a composite plastic material resin, preferably a thermosetting polymeric matrix or a thermoplastic polymeric matrix, reinforced with a reinforcing fibers, e.g. a glass fiber or a carbon fiber. Preferred thermosetting polymers include but are not limited to e.g. epoxy, polyester resin, or vinylester or combinations thereof. The glass fibers are made of various types of glass and may contain silica and/or silicate, with varying amounts of oxides of calcium, magnesium, and sometimes boron. Carbon fibers and fiberglass are the most common reinforcements in thermoplastic composites, but fibers such as aramid fibers, boron fibers, and ceramic fibers like silicon carbide fibers or aluminum oxide fibers may also be considered depending on the requirement for the final products.

A sheet of fiber-reinforced composite can be made in e.g. a hand lay-up process or in a spray lay-up process.

In the general hand lay-up process the chosen mold is initially coated with a gel coat to facilitate the removal of the end product from the mold. Then a resin mixture, e.g. including polyester, vinyl or epoxy as mentioned above, is added to the mold. Next fiber mats, such as fiberglass mats, are laid into the mold, more resin mixture is added by using a brush or roller so it conforms to the mold, and so that no air is trapped between the fiberglass and the mold. Additional resin is applied and possibly additional sheets of fiberglass. Hand pressure, vacuum or rollers are used quickly to remove any air pockets left, and to saturate all fiberglass skins with resin mixture before the resin starts to cure. If high temperature resins are used there is better time for removing air pockets, compacting the layers and smoothing surfaces because curing will not start before heating is applied to the mold. The mold may also be covered with some kind of lid, e.g. plastic sheets, and vacuum used to remove air bubbles and press the fiberglass to the shape of the mold. The hand lay-up process can be made more or less automated.

The spray lay-up process differs from the hand lay-up process merely in that the resin and fiber reinforcements are sprayed onto a mold either separately or as a composite mixture. The spray-up is compacted into a laminate using rollers. Then a core material, typically a foam core, can be added and a second spray-up layer be sprayed onto the core material to obtain the composite laminate, e.g. a fiberglass/foam sandwich. The foam core bonds between the fiberglass skins to achieve a composite laminate. The composite laminate is then cured, cooled and removed from the mold. Like the hand lay-up process the spray lay-up process can also be made more or less automated.

In both manufacturing processes it is known to use a gel coat as a release agent, and optionally for coloring. The gel coat typically has the same resin chemistry as the resin of e.g. the fiberglass composite and is sprayed into the mold as the initial step in the manufacturing process. As soon as the gel coat is in the mold, it begins to chemically transform from a liquid to a solid through cross-link polymerization. When the fiber-reinforced composite is applied in the following step, the cross-linking of the polymer chains occurs between the layer of gel coat and the skins of fiber-reinforced composite, so that the gel coat and the fiber-reinforced composite skin bond as one layer at the molecular level. The gel coat is this way made an integral part of the fiber-reinforced composite.

Conventionally, a modular assembly structure of e.g. fiberglass/foam sandwich material, such as e.g. a nacelle cover or a spinner cover, needs to be molded in smaller individual sections, thus as a plurality of smaller unique parts or elements that are molded separately. Each part is made with a customized coupling profile tailored uniquely to join with the adjacent part. Thus adjacent parts have unique coupling profiles, made in the molding process so that the part including the coupling profile has an exterior closed surrounding fiberglass composite skin. The place and design of the coupling profiles on adjacent parts must be chosen at an early stage prior to molding the parts, so that adjacent coupling profiles mate exactly when the adjacent parts are to be assembled. Mating coupling profiles of adjacent parts are designed and customized in view of the shape and design of the final structure and the later assembling of just these two parts. A model or master of the end product is studied to establish were seam lines can be acceptably positioned on the end structure, e.g. in view of finishing, assembling, structural integrity, concealing, demolding and how the mold for the separate part(s) will be disassembled and reassembled after use. The model or master is cut in sections and used to make several separate molds for molding the individual parts with unique coupling profiles to assemble into the larger end structure. This procedure is expensive, takes a lot of time and a lot of space, and cannot be subjected to line productions, since each modular assembly structure is made up of unique smaller part with unique coupling profiles. Some modular assembly structures are one of a kind, and the separate parts will pick up all shapes and features of the mold so the quality of each separate part is heavily influenced by the quality of the mold made from the model. It is also very expensive to store, before, during and after molding, the many molds and molded parts, and to transport the odd-shaped smaller parts, as well as it is a challenging task to assemble the final structure seen from the perspective of spatial organization. And even if the set of molds for the final structure can be reused in serial productions, such serial production still takes time, and any little error in the mold part are repeated for all components being molded in said mold part.

So furthermore, before a large structure, such as a nacelle cover, goes into serial production, it must undergo a stringent product development cycle. Parts and components are designed, prototyped, tested, validated, and certified, when necessary, at an appropriate level. So composing various shapes and sizes of e.g. nacelle covers from same kind of panel sub-elements remains a challenge and a prejudice within the art, and has hitherto not been contemplated and realized with success.

To remedy some of the problems with the conventional technology India patent application no. 2011 IN-MU03105 proposes to make a modular nacelle cover of a plurality of panels, instead of from numerous dissimilar components, which must be drilled through and connected using bolts. This known, modular, wind turbine nacelle cover needs, as a precondition, a rigid framework having a plurality of metal frames. Each frame comprises a base support member, left and right support members, a top support member and corner support members, and that each support member is interconnected to form the frame. A plurality of side panels are configured to be mounted between the frames, and a plurality of corner panels are configured for being mounted between the frames. The panels are molded as separate parts from fiber-reinforced polymer from a single mould by using Resin Transfer Molding (RTM) method, hand-lay up or foil infusion. The panels have a flange edge of a C-shaped coupling profile configuration at each side for overlapping with a similar flange edge of an adjacent panel on the support members of the framework. The need for a framework to support and attach the panels is an indispensable precondition because the relative thin polymeric panels need supporting to keep structural strength. Moreover, the panels are also curved at the profiled edges and cannot be made from elongate substantially flat panels because the C-shaped coupling profiles protrude above the face plane of the panel. These known panels are molded separately, ready-for-use, and should not be machined, nor are they provided from a composite laminate having a center core.

SUMMARY OF THE INVENTION

In a main aspect of the present invention is provided a method of the kind mentioned in the opening paragraph by means of which the manufacturing of a large modular structure of composite laminate can be simplified.

It is another aspect of the present invention to provide a method of the kind mentioned in the opening paragraph by means of which the manufacturing of large structures of composite laminate can be made faster and easier than hitherto known.

It is another aspect of the present invention to provide a method of the kind mentioned in the opening paragraph by means of which panel sub-elements for a modular assembly structure of composite laminate can be pre-manufactured as standard panel sub-elements.

It is another aspect of the present invention to provide a method of the kind mentioned in the opening paragraph by means of which the panel sub-elements for a modular assembly structure of composite laminate can be made using a minimum of molds.

It is another aspect of the present invention to provide a method of the kind mentioned in the opening paragraph by means of which a modular assembly structure of composite laminate can be assembled of a minimum of different sets of panel sub-elements of standard size and standard configuration, preferably be assembled from panel sub-elements and additional sub-components at stock.

It is another aspect of the present invention to provide a method of the kind mentioned in the opening paragraph by means of which a modular assembly structure of composite laminate can be assembled of a minimum of different sets of panel sub-elements of standard size and standard configuration, preferably be assembled from panel sub-elements and additional sub-components at stock.

It is another aspect of the present invention to provide a method of the kind mentioned in the opening paragraph by means of which a modular assembly structure of composite laminate can be assembled without using a supporting framework or skeleton for securing and supporting the panel sub-elements, such as not using without using a supporting metal framework or skeleton for securing and supporting the panel sub-elements.

It is another aspect of the present invention to provide a method of the kind mentioned in the opening paragraph wherein panel sub-elements for a scaleable modular assembly structure of composite laminate are manufactured.

It is another aspect of the present invention to provide a method of the kind mentioned in the opening paragraph for manufacturing panel sub-elements for a modular assembly structure of composite laminate, which panel sub-elements are cut and machined from elongate composite laminate sheet panels at stock.

It is another aspect of the present invention to provide a method of the kind mentioned in the opening paragraph for manufacturing panel sub-elements for a modular assembly structure of composite laminate, which composite laminate is fiberglass/foam sandwich laminate.

It is another aspect of the present invention to provide a nacelle cover made of a minimum number of different sets of panel sub-elements of composite laminate having same design.

It is another aspect of the present invention to provide a kit of panel sub-elements and sub-components for a modular assembly structure of composite laminate.

It is another aspect of the present invention to provide a method for enabling designing a modular assembly structure of composite laminate from standard panel sub-elements and standard sub-components.

The novel and unique whereby these and other aspects are achieved according to the present invention consist in that the method comprises the pre-processing steps of a) casting an elongate composite laminate sheet panel having opposite first and second fiber-reinforced plastic face skins sandwiching a core, a free first elongate edge and an opposite second elongate free edge, b) demolding the elongate composite laminate sheet panel, and c) cutting the demolded elongate composite laminate sheet panel into shorter sections, thereby providing sections with at least one free cut edge, a free first edge having the same profile as the free first elongate edge, and a free second edge parallel to the free first edge and having the same profile as the free second elongate edge.

Casting step a) can be performed in any desired way as long as the resulting elongate composite laminate sheet panel can be demolded in step b) to be cut in step c).

In step a) the elongate composite laminate sheet panel can e.g. be made in an elongate female standard mold to produce standards panels of a given length selected in accordance with the intended lengths of the subsequent sections to avoid excessive waste of panel length. Casting can be performed in a multiplicity of identical molds at the same time. The mold have a limited height and are elongate, and can thus be stacked for curing, which curing preferably may take place in an oven or by UV radiation, depending on the selected polymer, to expedite the curing process to set the molds free for a new mold cycle.

An alternative step a) includes to manufacture the elongate composite laminate sheet panel in an endless mold. Such a mold can e.g. be an endless mold with a closed bottom wherein the fiber-reinforced plastic composite skins can be applied sequentially, e.g. as mats, pre-pregs, or by spray-up, and wherein curing and demolding can be conducted continuously at consecutive downstream stations of the production line.

Preferably the elongate composite laminate sheet panel is manufactured from fast curing polymeric components to speed up steps a) and b).

In step c) the elongate composite laminate sheet panel is cut into shorter sections in view of subsequent use or processing.

For example can each of the sections serve as a blank for the further machining in a step d), wherein at least a first coupling profile is provided along the at least one free cut edge.

Before performing step d) the sections created in step c) has at least one free cut edge, a free first edge having the same profile as the free first elongate edge of the elongate composite laminate sheet panel cast in step a), and a free second edge having the same profile as the free second elongate edge of the elongate composite laminate sheet panel cast in step a).

In the most simple embodiment of a panel sub-element the so obtained section(s) can be machined in step d) so that the at least one cut edge is provided with a first coupling profile. Both steps c) and d) can be performed immediate subsequent to step b) or later. Yet an option is to perform step c) immediate after step b), and perform step d) later. Yet an option is to make the machining of step d) simultaneously with the cutting of step c).

In an alternative embodiment step d) can be performed by providing the first coupling profile as a separate part, and attaching said first coupling profile along a free elongate edge and/or a cut edge of the elongate composite laminate sheet panel, or along a free edge and/or cut edge of a section for a panel sub-element. Preferably a first coupling profile in form of a separate part can be attached at least along the at least one free cut edge using any suitable attachment means. Such attachment means includes, but are not limited to fastening by means of gluing and/or other fasteners. Intermediate fastening profiles can e.g. be used between a respective free elongate edge and a separate coupling profile, and glue and any kind of fasteners used in addition to create a solid and reliable fastening of the separate coupling profile to the free cut edge. An exemplary intermediate fastening profile can e.g. have an H-shaped cross-sectional area to receive opposite facing free edges or coupling profiles of a panel sub-element and the opposite separate coupling profile that needs to be added to the panel sub-element to confer the demanded coupling functionality to said panel sub-element. Separate coupling profiles can be added to any free edge of either the entire elongate composite laminate sheet panel, or to any edge of a section, whatever is convenient and expedient.

By means of preprocessing steps a)-d) are manufactured a plurality of similar panel sub-elements ready for use in assembling a modular assembly structure.

Different kinds of panel sub-elements can be manufactured this way. The cutting of step c) can e.g. be adjusted to cut sections of different lengths and this way manufacturing batches of panel sub-elements of different lengths but typically with same width, although subsequent lengthwise cutting and machining also can be done. Typically the length of a panel sub-element may be selected in accordance with either of the height, width or the depth of the modular assembly structure. Contrary to provide all coupling profiles during casting, as in conventional techniques, the machining in step d) can expediently provide a panel sub-element with a specific coupling profile at any stage after step c).

So in contrast to the conventional very large structures that are assembled of a multiplicity of smaller customized parts of composite laminate, e.g. fiberglass/foam sandwich laminate, the present invention proposes to make the modular assembly structure without the need for first making many customized mold parts from a physical model. Instead the modular assembly structure is assembled of a few different kinds of panel sub-elements of composite laminate sheet panel and optionally a few additional further sub-components. The panel sub-elements have standard coupling profiles, a few standard sizes and standard shapes, and the panel sub-elements can easily be further machined, down-sized, and/or processed to make special adapting features, such as recesses, cut-out sections, being further divided, etc., for facilitating coupling and connection to other machinery and installations, and to fit any special needs. So a lot of costs are saved for customized mold manufacturing, laying-up, as well as a lot of assembling time can be saved due to time saved to identify the right assembling order of the jigsaw of a conventional custom-made modular assembly structure. Many sizes of standard structures can be manufactured from the same limited kinds of standard panel sub-elements. As such it doesn't matter if the modular assembly structure is a four-panel sub-element long structure or a five or longer panel sub-element structure; the source of panel sub-elements to be assembled is mostly the same.

Contrary to the prior art, in which all coupling profiles are created during molding, at least a first coupling profile(s) can be machined later in the at least one free cut edge of the cut section to create a panel sub-element.

Both opposite cut edges of a section may be provided with machined coupling profiles. The machined coupling profiles may have identical or different cross-sections, including cross-section being mirror-imaged, depending on the later use in the modular assembly structure, and in view of providing a panel sub-element with a degree of freedom of orientation.

The first coupling profiles at opposite free cut edges may e.g. be shaped so that it does not matter which end or edge of the panel sub-element that faces up or down, or to the right or left. Alternatively, the cut section can be machined so that the finished panel sub-element has a fourth machined coupling profile at a free cut edge opposite the first coupling profile. A cut section can also have a cast first coupling profile and/or a machined fourth coupling profile at the opposite free edge.

The machining can be done as soon as a section has been cut from the elongate composite laminate sheet panel so that a panel sub-element is manufactured instantaneously as a ready-to-use product, or more or less machining can be done later, in which case either the elongate composite laminate sheet panel or the cut sections are stored as semi-manufactured articles.

The free first elongate edge of the elongate composite laminate sheet panel may be provided with a second coupling profile, and/or the opposite second elongate free edge of the elongate composite laminate sheet panel may be provided with a third coupling profile, which second and third coupling profiles advantageously serve to easily join two adjacent panel sub-elements side by side. The second and third coupling profiles can be cast or machined.

In view of said joining the second coupling profile and the third coupling profile may be identical or different in view or versatile use and orientation, as well as to have a degree of freedom of orientation of the panel sub-elements. Preferably the second and third coupling profiles are complementary to mate together, and this way conferring the property to the panel sub-element of being connectable in side-by-side series. A long series of such panel sub-elements can then e.g. be formed into a closed annular structure by joining the second coupling of the first panel sub-element in series to the third coupling profile of the last panel sub-element of the series.

The elongate composite laminate sheet panel manufactured in step a) and b) can be substantially flat, thus be substantially straight between the free first elongate edge and the opposite second elongate free edge, at least on one of the face skins. However during the casting, curing and/an demolding there is a tendency that a cast object shrinks slightly, and/or turns the free first elongate edge and the opposite second elongate free edge upwards away from the bottom of the mold, so that said free first elongate edge and opposite second elongate free edge comes slightly towards each other. The elongate composite laminate sheet panel may still be perceived as overall flat in such configuration although its elongate edges can deviate slightly from the overall at least one face skin plane of the elongate composite laminate sheet panel. Optionally the free first elongate edge and the opposite second elongate free edge may deviate to the same side of the elongate composite laminate sheet panel manufactured in step a) and b) to make the composite laminate sheet panel insignificantly concave/convex. Emphasis is made that any bending, concavity/convexity of an elongate composite laminate sheet panel produced in steps a) and b) are so little that the overall perception of said elongate composite laminate sheet panel is that it a flat board, optionally with reinforcing ribs, as will be described in further details below.

The second coupling profile and/or the third coupling profile can be provided in several ways to the panel sub-element, and in manners similar to the first coupling profile, as described above.

One way is to mold one or both of the second coupling profile and the third coupling profile as an integral part of the elongate composite laminate sheet panel in the casting step a). In this embodiment the mold is designed in advance for the manufacturing of the respective coupling profile, so that the profiles of the respective second and third coupling profiles can be made immediate ready for mating. Preferably a second coupling profile and a third coupling profile mate together when creating a joint between adjacent panel sub-elements. Accordingly, a panel sub-element in a row of joined panel sub-elements may have both a second and a third coupling profile so that the same kind of panel sub-element is repeated along the assembled row of panel sub-elements. In the alternative a first panel sub-element type may have the same second coupling profile along both the free first edge and the free second edge, which first panel sub-element type is assembled alternate with a second panel sub-element type having a third coupling profile along both of its free first edge and free second edge.

One or both of the second coupling profile and the third coupling profile can in the alternative be made by machining the entire free first elongate edge and/or the entire opposite second elongate free edge of the elongate composite laminate sheet panel in a further step b') performed after step b) and performed before step c). In this embodiment the elongate composite laminate sheet panel can simply be made by molding a simple rectangular composite laminate sheet with parallel short and parallel long side edges, optionally exposing the core between opposite face skins.

The second coupling profile and the third coupling profile can also be machined in the cut section at the same time as the at least one first coupling profile is machined in the at least one first cut edge in a further step c' performed before step c), be machined in step d), or be machined after step d).

Thus machining of a coupling profile can be done at any appropriate stage during the method of the present invention, as well as machining of a coupling profile can be done to any free edge of the elongate composite laminate sheet panel, any free edge of a cut section and to any free edge of any semi-finished panel sub-element.

The machining exposes the core, e.g. a foam core, which normally not is accepted in the wind mill industry, however because of the mating standard design of the respective coupling profiles any exposed core will be confined in a closed joint e.g. between face skins of adjacent panel sub-element, or between a face skin of a panel sub-element and any additional sub-component needed to assemble the modular assembly structure, as will be described in further details below with reference to the figures. In view of opening the foam core by machining a preferred foam core has a closed cell structure to reduce vulnerability to ingress of humid and liquid.

At least the pre-processing steps a), b) and c), and preferably also step d) can be performed in a continuous line production process to save handling time. Such a line production process may have several consecutive manufacturing stations for performing each of the respective pre-processing steps. For example a suitable line production process may include a casting station, a curing station, a demolding station, a cutting station and a machining station. The machining station of the line production process may even be followed by further finishing stations, such as painting stations, labeling stations, quality check stations, test stations, sorting stations, etc. A semi-automated or fully automated line production process is preferred, such as a continuous, fully automated, s line production process. Robots and computerized equipment may advantageously be implemented to streamline the method and the production line to cancel the need for human interaction and associated unforeseeable impact on the manufacturing process. However, partly automated or fully non-automated production processes and methods are not excluded within the scope of the present invention.

The machined panel sub-elements constitute intermediate panel products that in a further step e) can be kept at a stock until picked up for subsequent assembling into kits for the modular assembly structure. This way the kinds and numbers of various panel sub-elements for the modular assembly structure can be collected at the storage, packaged and delivered to the customer immediately or just shortly after an order has been placed. Further sub-components needed for assembling the modular assembly structure may be part of the kit and picked from stock as well.

Alternatively the elongate composite laminate sheet panel can be stored as an intermediate panel product prior to being cut into sections in cutting in step c).

In similar manner further sub-components needed for assembling the modular assembly structure may be kept at stock as semi-finished products, which are processed to order, e.g. also cut and/or machined, for a kit of parts for the modular assembly structure.

The method may comprise the one or more further step(s) f) of providing at least one additional coupling means to any of the first coupling profile, the second coupling profile, the third coupling profile and/or fourth coupling profile, irrespective of such a coupling profile are cast or machined. An additional coupling means can e.g. be selected from the group comprising adhesive means, optionally an adhesive tape, and/or mechanical fastening means, optionally the mechanical fastening means includes mounting holes for receiving blind fastener, such as pop rivets, and/or backing means for the blind fasteners, and combinations of these additional coupling means. Mounting holes can be provided at any location not limited to locations at the first, second, third and fourth coupling profiles. Mounting holes can also be provided retracted from a respective coupling profile, extend fully or be blind holes extending partly through the composite laminate at any location, extend through the complete thickness of a panel sub-element, or be adapted to various kinds of rivets, screws or bolts. Backing means, such as e.g. clips for pop rivets and washers for bolts, can be provided in association with the mounting holes.

A blind fastener system is preferably used for assembling the panel sub-elements manufactured by the method of the present invention to avoid, to the largest extent possible, excessive further penetration of an exterior skin layer of fiber-reinforced plastic during assembling the final modular assembly structure. Further advantages of using blind fasteners is that they can be applied fast and easy, e.g. using riveting tongs, in particular where access from both sides of the part to be assembled are difficult. Due to allowing vibration-proof assembly, without surface marring, as well as providing a tamperproof high grip and high pull-up strengths the pop rivets are the preferred mechanical fastening means for mounting in mounting holes when assembling the panel sub-elements and the further sub-components of the modular assembly structure.

Step f) of providing additional coupling means to a coupling profile can expediently be performed after step b) and prior to step c), after step b'), after step c'), and/or after step d). If e.g. an additional coupling means in form of an adhesive tape is applied on a coupling profile cast in step a), a first step f) may follow immediate after step b). Then a second step f) can follow before step c) is performed, which second step f) may include drilling the mounting holes for receiving mechanical fastening means, preferably blind fasteners, including mounting holes for receiving a suitable kind of blind rivet. In this embodiment the mounting holes can simply be drilled through the adhesive tape.

In an alternative embodiment the mounting holes for receiving blind fasteners are made prior to application of the adhesive tape and blind fasteners can simply be forced through said adhesive tape during assembling of the modular assembly structure.

In yet an alternative embodiment the mounting holes for receiving blind fasteners can be drilled in a first step f) after demolding in step b), and an adhesive tape having premade holes with corresponding distances as between the mounting holes can be applied to the respective coupling profile.

A step f) of providing the backing means as integral components embedded in the core, e.g. a foam core, can even be done in casting step a) by e.g. inserting backing means in form of e.g. strips and/or clips, e.g. of metal, in which case the backing means may be provided spaced apart from each other with distances that match the mounting holes. The strips or clips can e.g. distributed on a band that are interposed between two foam mats, of e.g. half the total thickness of the resulting core, along the free first elongate edge and/or the opposite second elongate free edge retracted from said free edges a distance that defines the locations subjacent the locations of the associated mounting holes. A step f) of inserting the backing means can at some locations also be done at the assembling site in conjunction with inserting blind fasteners. A step f) associated with the provision of a backing means can also be applied to the free cut edge of a panel sub-element after its corresponding cut section has been cut and machined by inserting the backing means between a face skin and the core.

For machined coupling profiles a step f) of providing holes for receiving blind fasteners can be made both after step b), after step b'), after step c'), or after step d), before or after another step f), with or without prior application of adhesive tape to the coupling profile, and in combinations of these alternatives.

Thus step f) can be provided at a multiplicity of stages during the method, and when it is convenient, favorable, and/or easiest.

The holes for receiving blind fasteners are thus always premade and need not be made in accordance with a certain design of the modular assembly structure. Premade holes are possible to implement for the later assembling because the dimension and shape of the modular assembly structure are standard dimensions determined by the standard-sized and standard-shaped panel sub-elements. It is thus known in advance where the position of the holes and blind fasteners are made or is to be made during the method. Up-scaling or down-scaling size and shape of the modular assembly structure is a matter of adding or reducing the number of panel sub-elements, and such scaling has little or no impact on the complexity of the assembling method itself. Up-scaling or down-scaling may also include down-sizing and further machining of a few of the panel sub-elements and/or further sub-components.

A further advantage of making a modular assembly structure as a scaleable and modular assembly is that knowledge of the modular assembly structures behavior when subjected to various exterior forces are easily calculated, simulated and thus predictable for a plurality of uses and environments.

As examples of how to manufacture the at least one additional coupling means of a respective coupling profile that can be provided in step f) can be mentioned that said at least one additional coupling means can be made e.g.

- by drilling mounting holes in any of the coupling profiles, preferably so that first mounting holes are drilled in the second coupling profile of the free first elongate edge and/or in the third coupling profile of the opposite second elongate free edge prior to step c), after step b') or after step c'), preferably so that the first mounting holes are provided in a respective coupling profile at locations selected for the later assembling of at a first coupling profile and a second coupling profile of adjacent panel sub-elements, and/or
- second mounting holes are drilled in the first coupling profile and/or the fourth coupling profile after step c), and/or
- the at least one additional coupling means is/are provided in form of a backing means, preferably a metal strip or metal clip, inserted in the core at locations selected to be below a mounting holes during assembling of the panel sub-elements, and/or
- the at least one additional coupling means is/are provided in form of an adhesive tape along the respective coupling profile either before or after drilling the mounting holes.

Combinations of one or more of the above-mentioned additional coupling means are within the scope of the present invention.

A machined coupling profile can be made at several stages of the method, including by machining in step d), machining in step b') and/or machining in step c'). The cross-section of a machined coupling profile can be obtained amongst other by removing one or more of

- at least an edge section of the first fiber-reinforced plastic face skin, and/or
- at least an edge section of the second fiber-reinforced plastic face skin, and/or
- at least some of an edge section of the core, preferably removing the entire thickness of the core along the respective at least one free edge section, and/or
- an edge section of the core between the first fiber-reinforced plastic face skin and the second fiber-reinforced plastic face skin.

Preferably a machined coupling profile is L-shaped, wherein the short leg of the L exposes the core and the long leg of the L is a protruding single fiber-reinforced plastic face skin. The L-shaped coupling profiles can be turned in overlapping relationship so that the exposed foam cores of the short legs are arranged with minimum gap facing each other, so that the cell structure of e.g. a foam core, becomes hidden and thus closed again, and so that the long legs of the L-shaped coupling profiles overlay e.g. the face skin of the adjacent panel sub-element. A backing means in form of a metal clip conveniently may have a length sufficient to reach from the free end of the long leg of the L and beyond the associated mounting hole. Preferably the backing means can have an aperture to receive the mechanical fastening means, which aperture is to be aligned with the respective mounting hole of the respective coupling profile.

Another profile of a coupling profile can be a key protruding between the first fiber-reinforced plastic face skin and the second fiber-reinforced plastic face skin, and yet a profile of a coupling profile can be a slot between the first fiber-reinforced plastic face skin and the second fiber-reinforced plastic face skin. These examples of profiles of coupling profiles should not be construed as limiting the options for implementing other designs of coupling profiles, whether these are machined or added by fastening.

In most embodiments of modular assembly structures the coupling profiles are intended also for coupling with other kinds of panel sub-elements or sub-components. Thus any of e.g. the machined or cast first, second, third and/or fourth coupling profiles can also be assembled with another sub-component used in the assembling method for obtaining the modular assembly structure. Examples of such sub-components include but are not limited to angle profiles for coupling two adjacent panel sub-elements into an angular relationships, or corner profiles to finish a corner when e.g. three panel sub-elements are to be assembled for creating a corner. Expediently the second coupling profile of one panel sub-element is designed to couple with a third coupling profile on the adjacent panel sub-element in a row or series of panel sub-elements.

The angle profiles may have coupling profiles similar to the panel sub-elements to couple with said panel sub-elements coupling profiles in a similar manner as described above. For securing joining of three panel sub-elements at a corner additional joining means may be needed, e.g. as backing means from inside the modular assembly structure, for further securing a corner profile to all three panel-elements that meet at a corner, optionally to any angle profile that reach into a corner as well.

Typically the length of a panel sub-element corresponds to the height of the modular assembly structure, as will be clearer in relation to the detailed description of preferred embodiments of the invention.

The elongate composite laminate sheet panel can advantageously be an elongate panel having one or more reinforcing ribs along the length. The cut sections of said start panel then get reinforcing ribs that run parallel to the free first edge and the opposite free second edge. The reinforcing ribs eliminate the need for a metal framework as a skeleton for assembling the modular assembly structure and confer structural strength to the modular assembly structure. The reinforcing ribs can preferably be distributed lengthwise of the elongate composite laminate sheet panel, preferably with equal distance. A reinforcing rib may simply be constituted by a longitudinal narrow protruding section along the length of the elongate composite laminate sheet panel, which longitudinal protruding narrow section has an increased thickness, thus an increased distance between opposite first and second fiber-reinforced plastic face skins, and accordingly a thicker core at the reinforcing ribs. The reinforcing ribs may protrude from the face skin intended to face inside the modular assembly structure but not on the opposite face skin so that the visual appearance from outside said modular assembly structure is free of reinforcing ribs. The reinforcing rib may have any suitable cross-section, including but not limited to semi-circular, trapez, trapezoid, parabolic, have indents and or protrusions, etc.

Thus in a preferred embodiment the reinforcing ribs can protrude from only one side of the elongate composite laminate sheet panel and the opposite side be substantially plane to provide the modular assembly structure composed of the panel sub-elements with an outer appearance that is visually acceptable and has the least possible number of cavities and crevices for accumulation of matter circulating in the environment where the assembled modular assembly structure is erected and put in operation.

When a machined first and/or fourth coupling profile is made it traverses the reinforcing ribs, and some of the reinforcing rib length may be machined off, in order for the first and/or fourth coupling profile to be able to fit with another sub-component for, via such a sub-component, being joined with another panel sub-element. Such other panel sub-element typically also lacks the reinforcing ribs along its width, thus along its first and/or fourth coupling profile. In case the first and/or fourth coupling profiles are added as a separate part, this separate part may expediently be predesigned so that the presence of reinforcing ribs extending to the free cut edge need not be taken into account and so that no reinforcing ribs need to be machined off.

An interactive software module may be adapted for designing the modular assembly structure from a number of panel sub-elements, e.g. so that the modular assembly structure comply with pre-defined and set criteria. The interactive software module may be configured so that a user is able to design his/her own modular assembly structure out of the panel-sub-elements as the basic structural elements, simply by using a user interface.

The interactive software module may be programmed to make modular assembly structures from panel sub-elements, and optional sub-components, known to said interactive software module and based on e.g. test results as well as safety standards. Test results can e.g. be established in order to design various modular assembly structures in view of structural strength under various exterior force applications, e.g. exterior force applications that mimics certain extreme conditions, such as wind force and weather conditions in general, that the modular assembly structure could be subjected to and must be able to resist in certain environments to comply with laws and regulations when put in operation. Both calculations based on theoretical test environments, as well as real time test results in a physical test environment, may be used as basic data of the interactive software module for the user to design his/her own modular assembly structure from the panel sub-elements manufactured by the method of the present invention.

The majority of the panel sub-elements for the modular assembly structure have standard size and standard shape so that interpolations and extrapolations can be made fast and easily, e.g. to up-scale a modular assembly structure already known to the interactive software module, as a springboard for creating further designs of modular assembly structures, and for making test models to physically test, confirm and verify calculated expectations before the up-scaled modular assembly structure becomes available to customers via the interactive software module.

The method of the present invention allows for the continuous manufacturing of panel sub-elements as standard panel sub-elements, so that said panel sub-elements always can be goods in stock, or be rapidly finished from semi-manufactured products at stock, for the panel sub-elements to be delivered to the customer without delay, preferably as a complete kit including sub-components needed for complete or almost complete assembling of the modular assembly structure. So said panel sub-elements can be also be made on demand from the composite laminate sheet panels that are goods in stock.

The interactive software module can be operated by the customer via the user interface to input data for individually designing the modular assembly structure as desired, albeit from a selections of standard panel sub-elements, but in confidence that the modular assembly structure will be safe to erect, and so that it comply with any legal criteria that might be associated with the field of technology wherein the modular assembly structure is to be used. Any further sub-components required for assembling a modular assembly structure are added to the customer's order by the interactive software module, e.g. in response to inputting at least data of the size and shape of the modular assembly structure.

If the user inputs data aiming for a modular assembly structure not hitherto tested or known to the interactive software module, he/she may initially be denied such an order, but he/she may inquire if such a modular assembly structure can be made after all. The providers and operators of the method, and of the interactive software module, may then decide if calculation suffices to set the special modular assembly structure free for ordering, or if the order is extreme and physical testing is needed to verify an already made theoretical and calculated confirmation of the unknown structure.

In a simple and preferred embodiment the casting of step a) can be performed inside a female mold, which optionally can be covered by a top part during casting. The female mold can be a continuous mold, whereby the elongate composite laminate sheet panel can be cast as a continuous length of elongate composite laminate sheet panel as a start panel.

In a preferred embodiment the female mold can be utilized as the mold part for creating the reinforcing ribs. In this embodiment the female mold can have lengthwise grooves. In the lay-up process the first skin layer is placed on the gel coat to conform to the inside face of the female mold, thus the first skin layer is placed intimately along the alternate lengthwise grooves and plateaus along the width of the female mold. The lengthwise grooves can then easily be filled up with core material, whereafter more core material, such as foam mats, is laid to cover the core material already inside the lengthwise grooves and on top of the plateaus. Then the second skin layer is applied and casting completed using any appropriate casting technique, e.g. vacuum infusion, and with or without a male mold part on top of the female mold or use of similar cover means.

The machining steps may include one or more of coincident drilling, milling and/or cutting, or combinations of these machining methods. The mounting holes for blind fasteners may advantageously be made by drilling and the machined coupling profiles made by milling.

The invention relates especially to a method of manufacturing laminate panel sub-elements for assembling into a nacelle cover, wherein the laminate panel sub-elements are cut as sections from an elongate composite laminate sheet panel instead of that the sub-elements for the nacelle cover is made customized with shapes and curvatures defined by the design of the nacelle cover and in limited volumes in accordance with specific design requirements. To obtain the nacelle cover of composite laminate panel sub-elements as in the present invention, said laminate panel sub-elements are advantageously pre-configured as standard panel sub-elements for being interconnected directly or via a sub-component. In configurations where panel sub-elements are to be assembled directly, e.g. side to side, the edges of the panel sub-elements may be provided with various coupling profiles as described above.

Optionally is at least one coupling profile of a panel sub-element for the nacelle cover made by machining a free edge produced as a result of cutting the laminate panel sub-elements into shorter sections. Mounting holes are pre-drilled at predetermined positions along the coupling profile in view of the panel sub-elements being guided into correct and not misaligned joining.

Sub-components, such as angle profiles, corner profiles and/or bracket means may be utilized in order to create the angle between joined panel sub-element to make a 3-dimensional modular assembly structure, whether said structure being a nacelle cover, a vehicle hull, a large container, or similar, and to reinforce the joining locations and joined panel sub-elements and sub-components to obtain sufficient strength for the end purpose of the modular assembly structure. Such sub-components may not accommodate the reinforcing ribs, in which case the part of such reinforcing ribs which are spatially obstructing the assembling are machined off, as discussed above. This is typically the situation where e.g. two panel-sub-elements are joined end-to-end but at an angle below or above 180°. The angle profile and the corner profiles may reach in contact with or be facing the exposed cores of the reinforcing ribs, and brackets be used to confine any gaps and hide the exposed core, as well as to enforce the joint from inside the modular assembly structure.

The invention also relates to a method of assembling the panel sub-elements manufactured by the above-mentioned method.

The assembling method of the present invention comprises
providing the panel sub-elements,
in case the coupling profiles has an additional coupling means in form of an adhesive tape removing any protective liner,
if a backing means are not already provided, providing the coupling profile with a backing means at assembling locations where blind fasteners, screws or similar mechanical fastening means are to be inserted through mounting holes,
arranging the coupling profiles of adjacent panel sub-elements in overlapping relationship,
securing the coupling profiles to each other by means of the additional coupling means, preferably securing by means of blind fasteners through the mounting holes, and/or by means of an adhesive tape,
optionally applying a joining pressure, such as to make sure that the panel sub-elements are in close joined contact.

Glue may be injected in a joint between overlapping coupling profiles either prior to or after securing the adjacent coupling profiles to each other by means of the additional coupling means. The glue provides additional attachment force and seals any remaining gaps and crevices at the joint.

Preferably a first coupling profile is profiled or has a profile to mate with a fourth coupling profile, and a second coupling is profiled or has a profile to mate with a third coupling profile, and the design of any of said coupling profiles may be present in any of the panel sub-elements and further sub-component, in particular in angle profiles.

Once the customer has placed an order for an assembly of panel sub-elements and sub-component of a modular assembly structure, these articles are picked and gathered from the stock, or finished from articles at stock, packed and shipped to the destination of assembling and erection. In fact it will be possible to ship the order for a modular assembly structure, such as a nacelle cover, within a day or even shorter.

The method of the present invention has its particular advantages in terms of manufacturing panel sub-elements for manufacturing cubic or cuboid modular assembly structures, such as a nacelle cover. The panel sub-elements of the present invention are all substantially flat and therefore easy stackable, so that both storage space and transport space are minimal compared to conventional storage requirements during transport of components and parts of a nacelle cover. The panel sub-elements are also much simpler and easier to handle and move around, including grasping, because the grasping equipment need not be altered each time a new panel sub-element and any optional sub-components need to be lifted and/or moved. A further advantage is that the modular assembly structure can be assembled of more and smaller panel sub-elements than previous modular assembly structures for the same purpose, which also contributes to saving costs for transport and storage. Yet an advantage is that the panel sub-elements can be manufactured fast on demand, so even in case that stock is low or out, the delay in shipping the order is insignificant compared to the long order times for conventional modular assembly structures, such as nacelle covers.

The present invention also relates to a modification of the above-mentioned method of manufacturing the panel sub-elements for a modular assembly structure. The method is modified in that in step a) the elongate composite laminate sheet panel is made by extrusion, optionally by pultrusion, and step b) is a curing step. No customized molds made from models of the modular assembly structure are needed for making the panel sub-elements by e.g. pultrusion.

BRIEF DESCRIPTION OF THE DRAWINGS

The modular assembly structure of the present invention is composed of panel sub-elements, and optionally also of sub-components, of very simple structure. Basically the present invention is not intended for manufacturing complex structures with high degree of curvatures. The vast majority of the panel sub-elements for the modular assembly structure comes in standard sizes for making modular assembly structures in standard designs defined by the sizes of the panel sub-elements as a limiting factor, but still with the possibility that a customer designs his/her own modular assembly structure out of these panel sub-elements, optionally in combination with a limited number of additional sub-components, as will be described below with reference to the accompanying drawing in which FIG. 10 is a sectional view taken through a joint between two adjacent coupling profiles of two basic panel sub-elements, FIG. 11 is an enlarged scale side view of a backing means, FIG. 12 is a perspective view of an angle profile, FIG. 13 is an end view of the same, FIG. 14 shows the nacelle cover shown in FIG. 9 where a side panel has been left out, FIG. 15 is a perspective view of a first bracket, FIG. 16 is a perspective view of a second bracket, FIG. 21 is a sectional view taken through a first embodiment of a joint between a free edge of a panel sub-element and a separate coupling profile, where the free edge does not have a pre-made coupling profile made during the casting, nor a machined coupling profile, FIG. 22 is a sectional view taken through a second embodiment of a joint between of free edge of a panel sub-element and a separate coupling profile, where the free edge does not have a pre-made coupling profile made during the casting, nor a machined coupling profile.

DETAILED DESCRIPTION OF THE INVENTION

Figure 1:
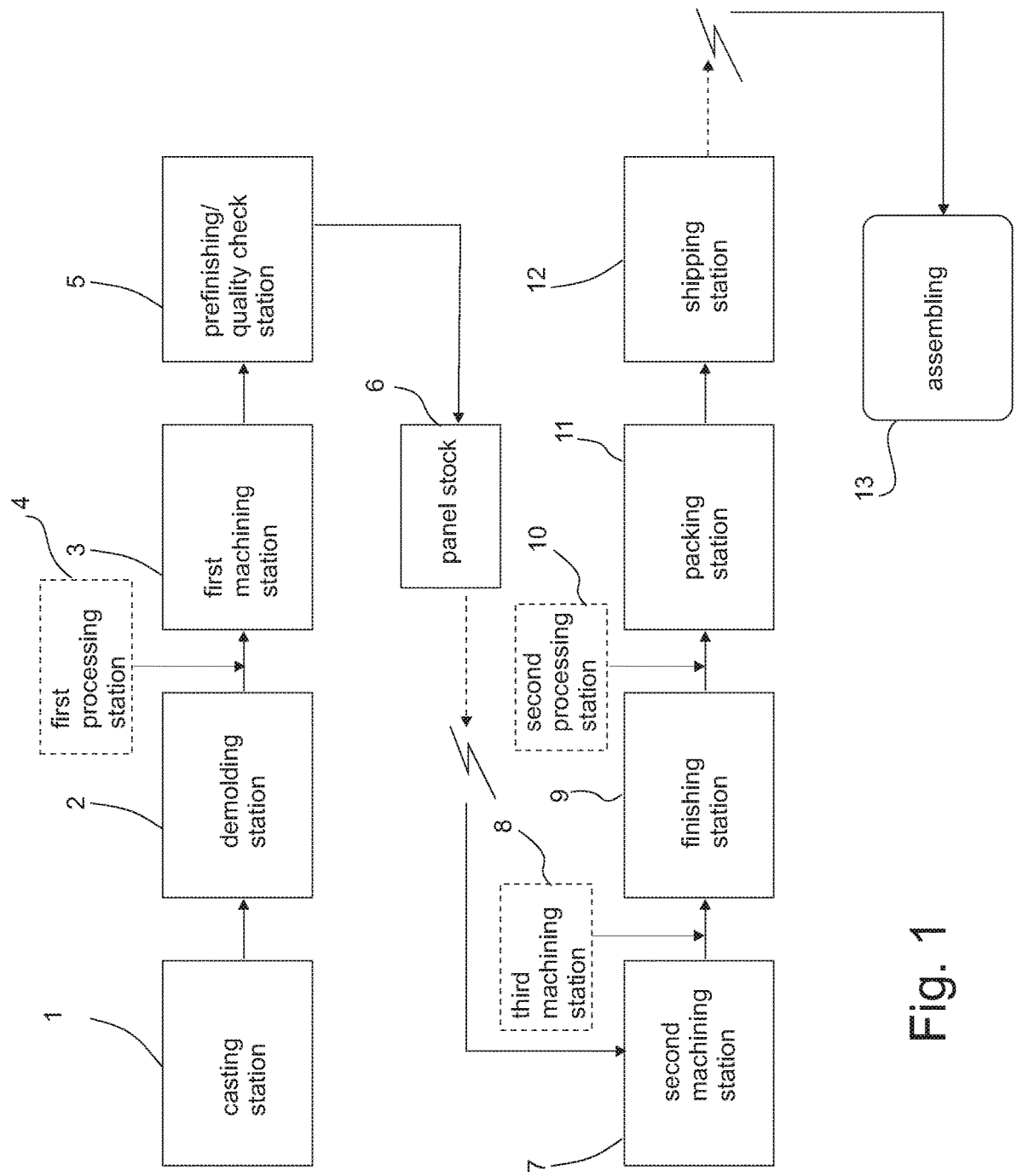
FIG. 1 is an overall flow sheet illustrating a first embodiment of the method of the present invention.

Below the methods of the invention is described as non-exhaustive and non-limiting examples in relation to manufacturing the elongate composite laminate sheet panel as a fiberglass/foam sandwich start panel. An example of a composite laminate sheet panel 18 is shown in FIG. 4 and a panel sub-element 34 made from said panel 18 is shown from opposite face skins 19,21 in FIGS. 5 and 6, respectively. Accordingly same reference numbers are used in relation to the description of the method in FIGS. 1-3, as for the panel sub-elements 34 shown in FIGS. 5, 6 and 7 and the elongate composite laminate sheet panel 18 seen in FIG. 4.

It should be noted that the elongate fiberglass/foam sandwich start panel and the panel sub-elements can have other design, including but not limited to other designs of coupling profiles, other distances between mounting holes, other thickness, width and length, and at least the second coupling profile and the third coupling profile can be made in a machining step instead of in a casting step. Mounting holes can even be made in the casting steps as well, and so can incorporation of backing means. The embodiments of methods, elongate fiberglass/foam sandwich start panel, panel sub-elements, sub-components, and modular assembly structure are provided as non-limiting examples of the multiplicity of embodiments that are possible to carry out and manufacture in accordance with the present invention. The examples given in the figures are thus not exhaustive of the invention.

In a first exemplary embodiment of the method of the present invention casting of the elongate fiberglass/foam sandwich start panel 18 takes place in step a) at a casting station 1, as will be explained further in relation to FIG. 2. In the casting step a) the opposite fibre glass layers for the exterior fiberglass skins 19,21 of the elongate fiberglass/foam sandwich start panel 18, and the foam core 35 layer inbetween the opposite fibre glass layers, may simply be supplied from rolls having a pre-defined width corresponding to respective widths suited for making the finished elongate fiberglass/foam sandwich start panel 18 without extra lengthwise downsizing to fit a mold. So the need for pre-cutting the opposite fibre glass layer and the foam core layer to certain shapes can be limited to traverse cutting from rolls lengths corresponding to about the length of the mold. Initial cutting of the layers to be laid-up are then substantially reduced because the width of the layers are given in advance to corresponds to the final width of the layers of the elongate fiberglass/foam sandwich start panel 18. This way considerable lay-up time, and thus casting time, is saved. The inventions do however not exclude laying-up smaller pieces of fiberglass layer blanks and/or foam core layer blank for casting the length of elongate fiberglass/foam sandwich start panel 18.

Step b) is performed at the demolding station 2, at which the cast and cured elongate fiberglass/foam sandwich start panel is taken out of the mold for further processing, such as cutting and machining. If e.g. the casting of step a) is performed using a vacuum mold, the pressure is equalized, and the top mold, such as e.g. a vacuum foil and/or a silicon cover, and/or a male mold part, is removed. Then the now solid cast elongate fiberglass/foam sandwich start panel 18 is taken out of the female mold, optionally out from a female silicon mold insert that lines the female mold to further ease removal of the cast elongate fiberglass/foam sandwich start panel, although gel coat has been applied.

The cast elongate fiberglass/foam sandwich start panel 18 then proceeds directly to the first machining station 3 wherein first mounting holes 29a,29b;30a,30b are drilled in accordance with a first step f) along the length of the opposite second coupling profile 23 and third coupling profile 25 of said just cast start panel. Optionally also second mounting holes 28a,28b are provided to a cast first coupling profile 27 at the short end of the elongate fiberglass/foam sandwich start panel 18 at the first machining station 3. Other kinds of machining can also be conducted at the first machining station 3, such as step b') of machining the second coupling profile 23 and third coupling profile 25 in case the elongate fiberglass/foam sandwich start panel 18 was cast without said second coupling profile 23 and said third coupling profile 25.

In an additional step f) prior to or after the first step f) an adhesive tape 45 can be applied to one or both of the second 23 and third coupling profiles 25, e.g. at a first processing station 4, as indicated by dotted line box.

Prefinishing, such as sanding, polishing and cleaning, of an elongate fiberglass/foam sandwich start panel 18 can take place at a prefinishing station 5, which also may serve as quality check station in which parameters such as surface structure, roughness, structural and chemical strength, coupling profile check, etc. are conducted. After the prefinishing/quality check station 5 the cast elongate fiberglass/foam sandwich start panels 18 are placed at panel stock 6 until an order for a modular assembly structure requires manufacturing of panel sub-elements 34 from the elongate fiberglass/foam sandwich start panel. In the alternative the elongate fiberglass/foam sandwich start panel is placed at panel stock 6 without prefinishing and/or quality check, in which case said prefinishing and/or quality check is performed when an elongate fiberglass/foam sandwich start panel 18 is picked from the panel stock 6 in order to be further preprocessed into panel sub-elements 34.

Figure 8:
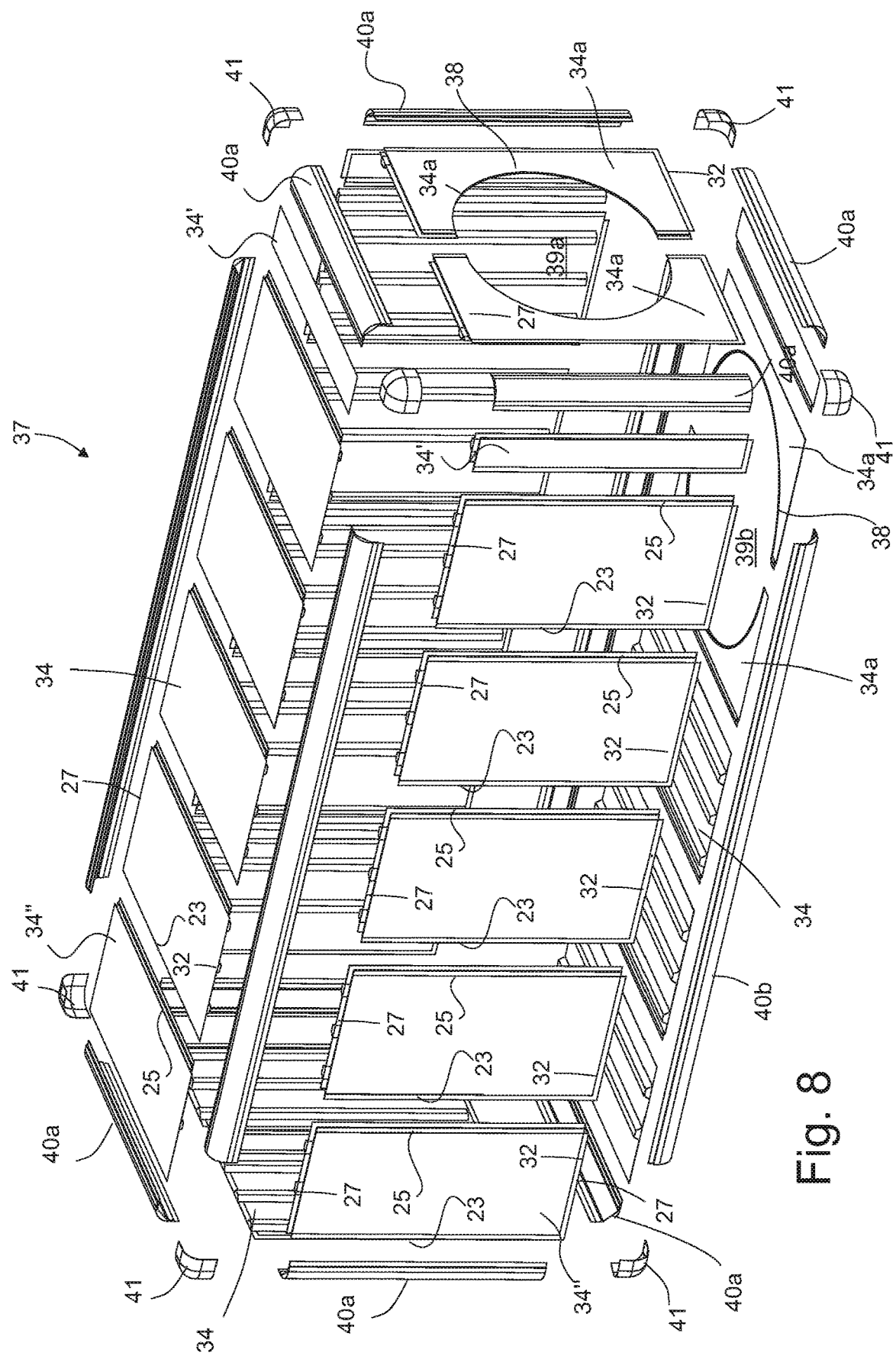
FIG. 8 is a perspective exploded view of a nacelle cover implementing the panel sub-elements.
Figure 9:
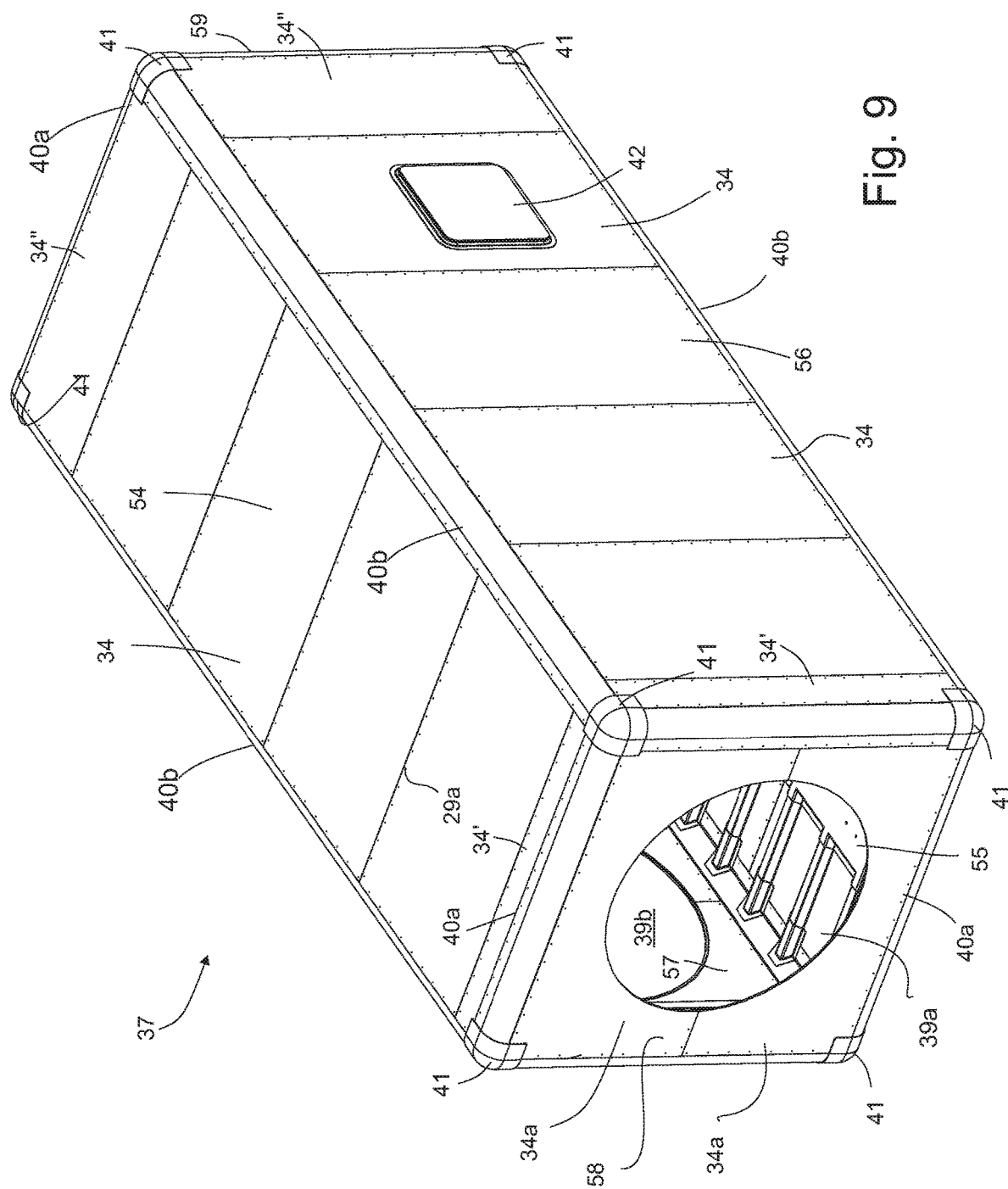
FIG. 9 shows the same in assembled state.

When the elongate fiberglass/foam sandwich start panels 34 for the modular assembly structure, e.g. the nacelle cover 37 seen in FIGS. 8 and 9, are collected at the panel stock 6, and optionally have been further pre-finished and/or quality checked, they are transported to the second machining station 7, where the elongate fiberglass/foam sandwich start panels 18 are cut into n shorter sections S1, S2, . . . , Sn, one after another, by traverse cutting, in accordance with step c) an elongate fiberglass/foam sandwich start panel 18 at (n–1) cutting lines CL. Emphasis is made that n can be 2. In the same second machining station 7, or in a separate subsequent third machining station 8, as indicated in dotted line box, the panel sub-elements 34 are machined along their free cut edge(s) 26 to provide said free cut edge(s) with a first coupling profile 27 or a fourth coupling profile 32.

It should be noted that in casting step a) of a method of the invention wherein a closed mold is used for manufacturing the elongate fiberglass/foam sandwich start panel 18, the opposite short ends of said elongate fiberglass/foam sandwich start panel may have been provided with cast first 27 or fourth 32 coupling profiles, corresponding mounting holes, additional coupling profiles and any mechanical fasting means to be applied to the cast first or fourth coupling profiles in a manner similar to performing same at the second coupling profile 23 and the third coupling profile 25, such as at the same time and at the same stations. So if an elongate fiberglass/foam sandwich start panel 18 is cut in just two sections S1 and S2, a first panel sub-element 34 made from the first section S1 may have a cast first coupling profile 27 and a machined fourth coupling profile 32, and the second section S2 may have a cast machined first coupling profile 27 and a cast fourth coupling profile 32.

In the event of cutting an elongate fiberglass/foam sandwich start panel 18 that has cast coupling profiles at its opposite short end any of the n–2 further sections Sn–2 may have both a machined first coupling profile 27 and a machined fourth coupling profile 32. So if an elongate fiberglass/foam sandwich start panel 18 is cut in several sections S the panel sub-elements 34 made from the end sections S1,Sn may have one cast coupling profile and an opposite machined coupling profile, but the rest of the panel sub-elements have opposite machined first and fourth coupling profiles. If the elongate fiberglass/foam sandwich start panel is cast without any coupling profiles at all, all of said coupling profiles are of course machined coupling profiles.

For the present exemplary embodiment of a method of the present invention adhesive tape 35, and/or mounting holes 28a,28b,29a,29b,30a,30b, and/or backing means 36 are provided to the first coupling profile 27 and/or to the fourth coupling profile 32 at a subsequent finishing station 9 or at a subsequent separate second processing station 10, which second processing station 10 is indicated by dotted box in FIG. 1.

Accordingly adhesive tape 45 or other kind of adhesive means can e.g. be added to one or more of the first coupling profile 27, the second coupling profile 23, the third coupling profile 25, and/or the fourth coupling profile 32 at the prefinishing station 4, be added in a separate first processing station 4 arranged after the demolding station 2 or after the first machining station 3, or be added in a separate second processing station 10 after the finishing station 9 or after the prefinishing station 4, or be added in a separate processing station (not shown) after the second machining station 7, or be added even in the finishing station 7 or in a the finishing station 7. Combinations of these stages of applying the adhesive tape 45 are within the scope of the present invention. In particular the application of the adhesive tape 45 or of other kind of adhesive means can be done at any step of the method of the present invention wherein a coupling profile is exposed and ready for said application. In particular in a hand lay-up process, where elongate fiberglass/foam sandwich start panels are cast to length there exist a versatility of stages during the method of the present invention wherein the adhesive tape 45 can be applied.

A third step f) can include incorporating an additional coupling means in form of the backing means 36 for the blind fasteners means 43 when these are inserted through mounting holes 28a,28b;29a,29b; 30a,30b. Such a third step f) can, as explained above, be made as an integral part of casting step a) if backing means 36 are needed along a cast first 27, second 23, third 25 or fourth 32 coupling profile at all. Backing means 36 needed along machined coupling profiles can be inserted into the exposed foam core 35 from the side, e.g. be shot into the foam core 35 from the side using a tool suitable configured in accordance with the depth, which the backing means 36 needs to reach inside the foam core 35 to be properly aligned below mounting holes 28a,28b;29a,29b; 30a,30b. Alternatively the backing means 36 are pushed inside the foam core 35 from the exposed machined side by hand or by hammering.

After the panel sub-elements 34 leaves the finishing station 9, optionally the second processing station 10, the panel sub-elements 34 may or may not be transferred back to a panel sub-element stock 17, or be packed at the packing station 11, optionally together with further required sub-components, for further shipping to the customer via the shipping station 12, as shown in FIG. 1. Assembling 13 of the modular assembly structure takes place where appropriate, and with a minimum of skills due to the modular assembly structure being composed of a limited number of kinds of standard components, and the resulting shape are not complex.

Application of adhesive tape 45 along any cast coupling profile is preferably made after the demolding station 2 at the first processing station 4, and application of adhesive tape 45 to the machined coupling profiles is preferably made at the third machining station 8 if the machined coupling profile is provided at said third machining station 8 at the same time as the sections S1, . . . , Sn have been cut from the endless length of continuously cast elongate fiberglass/foam sandwich start panel 18. The machined coupling profiles can also be made at the third machining station 8 or even at the second processing station 10.

Figure 2:
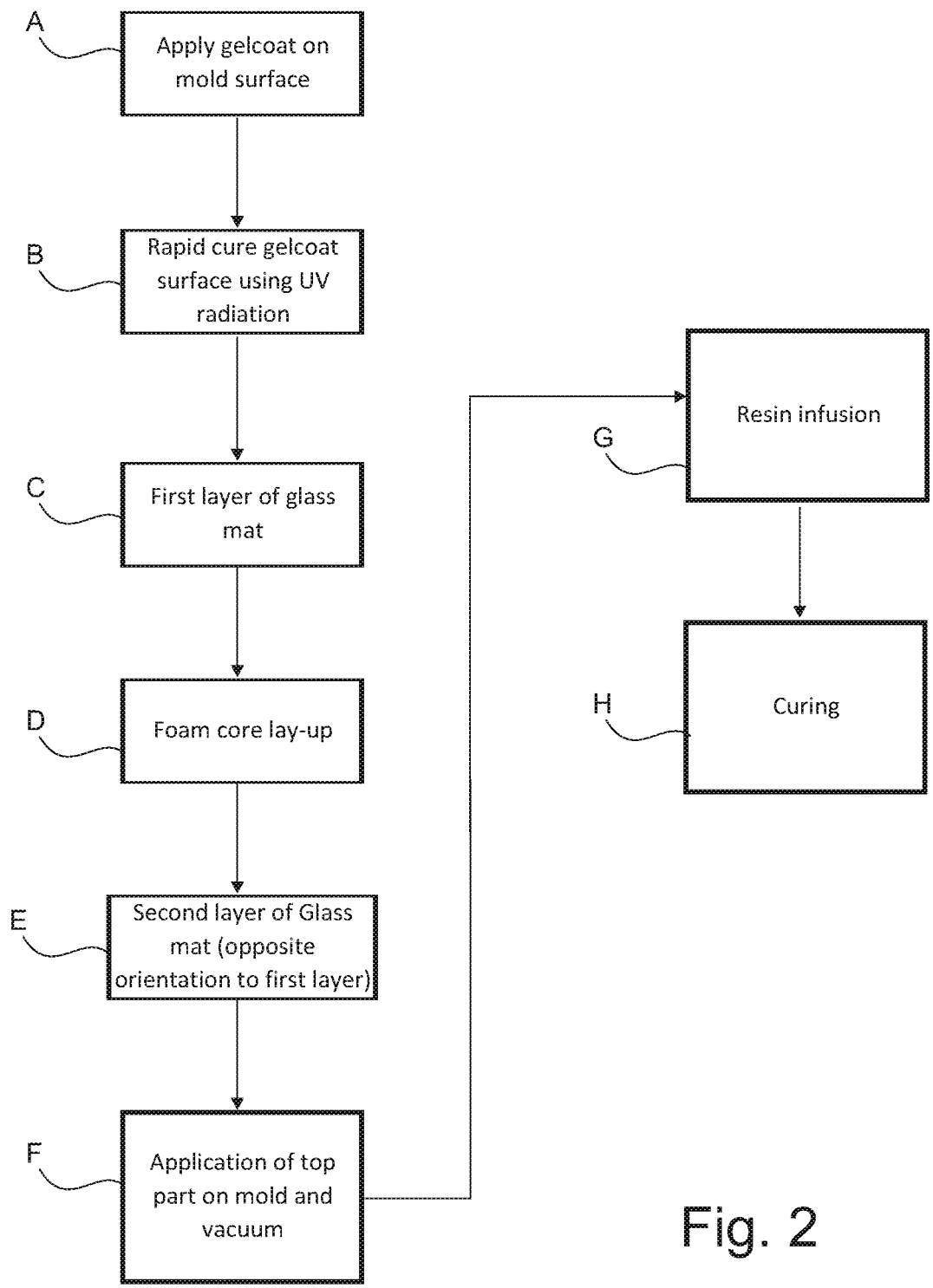
FIG. 2 is a flow sheet of an embodiment of the casting of step a)

The most important casting sub-steps of a simple embodiment of step a) are shown in FIG. 2.

In sub-step A a mold for casting an elongate fiberglass/foam sandwich start panel 18 is coated with gel coat. In subsequent sub-step B the gel coat is subjected to UV radiation to at least partly cure said gel coat, whereafter in sub-step C, which is a lay-up step, a first layer of fiberglass matt is placed along the length of the gel-coated mold. In sub-step D foam core mat is laid-up on top of the first layer of fiberglass matt and then, in sub-step E a second layer of fiberglass is laid-up on top of the foam core layer. The mold is then covered in sub-step F and placed under vacuum, so that when the polymer resin is infused in sub-step G, said resin distributes into the opposite exterior layers of fiberglass matt and sufficient into the foam core layer to bond into a coherent structure with structural strength that allows the start panel 18 to be cut and machined once the resin has been allowed to cure in sub-step H. Then demolding takes place in step b).

Such sandwich constructions typically include a lightweight core that has a flexural strength and flexural modulus far exceeding that of the fiberglass skin laminates alone. The low-density core material does not directly contribute to the stiffness of the start panel; rather it is the distance between the skin layers that is the major factor. So by adjusting the thickness of the core material, composite sandwich panels with more or less stiffness can be created. Thus bendable elongate composite laminate panels can be manufactured using the same procedure.

While the core material keeps the fiberglass skin layers an equal distance apart from each other thereby increasing the stiffness of the combined composite laminate structure, it also bears most of the shear loading. In bending, the lower skin layer is in tension, while the opposite fiber-reinforced plastic skin layers are in compression thereby putting the core in shear. In order for the composite laminate panel to function correctly the bonding between the skin layers and the core material is preferably at least as strong as the core material itself, so that loads can be transferred to eliminate or at least reduce the risk of delaminating, cracking, and propagation of such when the structure is subjected to exterior forces. Without a proper bond, the three layers, thus the core and opposite skin layers, plates and the stiffness and controlled bending ability are lost.

A multiplicity of kinds of fiberglass mats and foam cores can be used, including commercially products that can be purchased from a plurality of providers, and be stored on rolls, from which rolls suitable lengths that fit the length and width of the mold are cut. Alternatively the fiberglass mats and foam cores can be purchased as sheets or mats.

As a non-limiting example of a fiberglass composite for laying-up the layers of the start panel in step a) of the present invention can be mentioned COMBIMAT 1380. Combimat 1380 is a stitch-bonded composite fiber-reinforced fabric having an area weight of 1380 g/m$^2$. Combimat 1380 consist of four layers: a unidirectional roving layer in 0 degree direction (300 g/m$^2$), a unidirectional roving layer in 90 degree direction (300 g/m$^2$), a polypropylene non-woven layer in the middle (180 g/m$^2$), and a layer in form of chopped strands (CSM) on the outside of the polypropylene layer (300 g/m$^2$). The thickness of the Combimat 1380 is about 1.9-2.0 mm. The chopped stand layer constitutes the exterior layer, the face skins of the elongate fiberglass/foam sandwich start panel. As the results of stress distribution, the stiffness of the region with the resin infused unidirectional roving layer in 90 degrees is lower than the stiffness of the region with the resin infused unidirectional roving layer in 0 degrees.

Changzhou Utek Composite Co., Ltd. is just one of many providers of the Combimat 1380 product.

Emphasis is made that Combimat 1380 is just one of a multiplicity of product that can be used to manufacture the elongate fiberglass/foam sandwich start panel. The foam core may be made of any suitable material, commonly used in composite sandwiches. Polymeric alternatives to polypropylene (PP) include, but are not limited to, polyvinyl chloride (PVC), polyethylene (PE) or polyurethane (PU). A non-exhaustive list of non-polymeric alternatives of core materials includes end-grain balsa and aluminium honeycomb cores.

Figure 3:
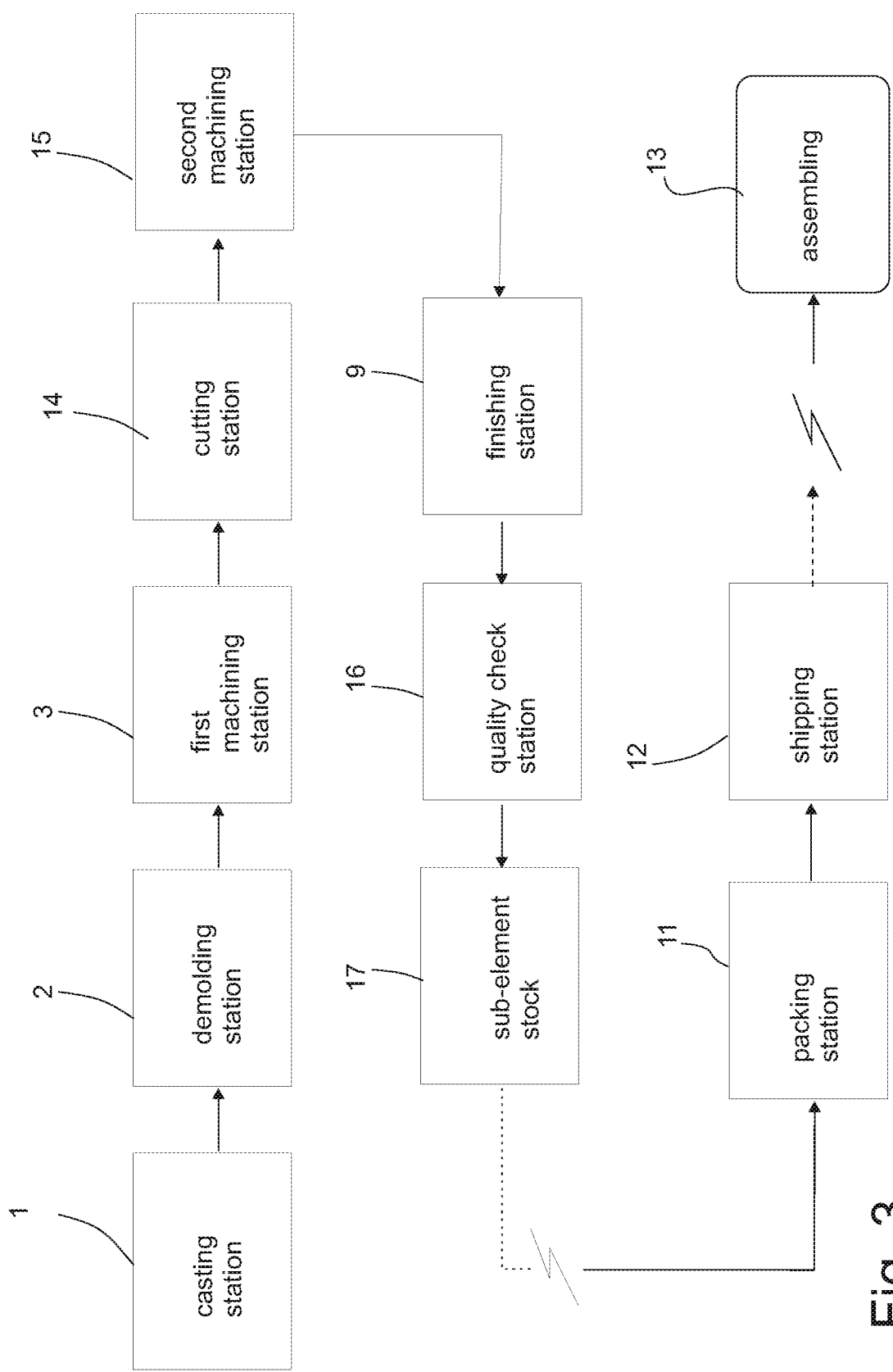
FIG. 3 is an overall flow sheet illustrating a second embodiment of the method of the present invention.
Figure 4:
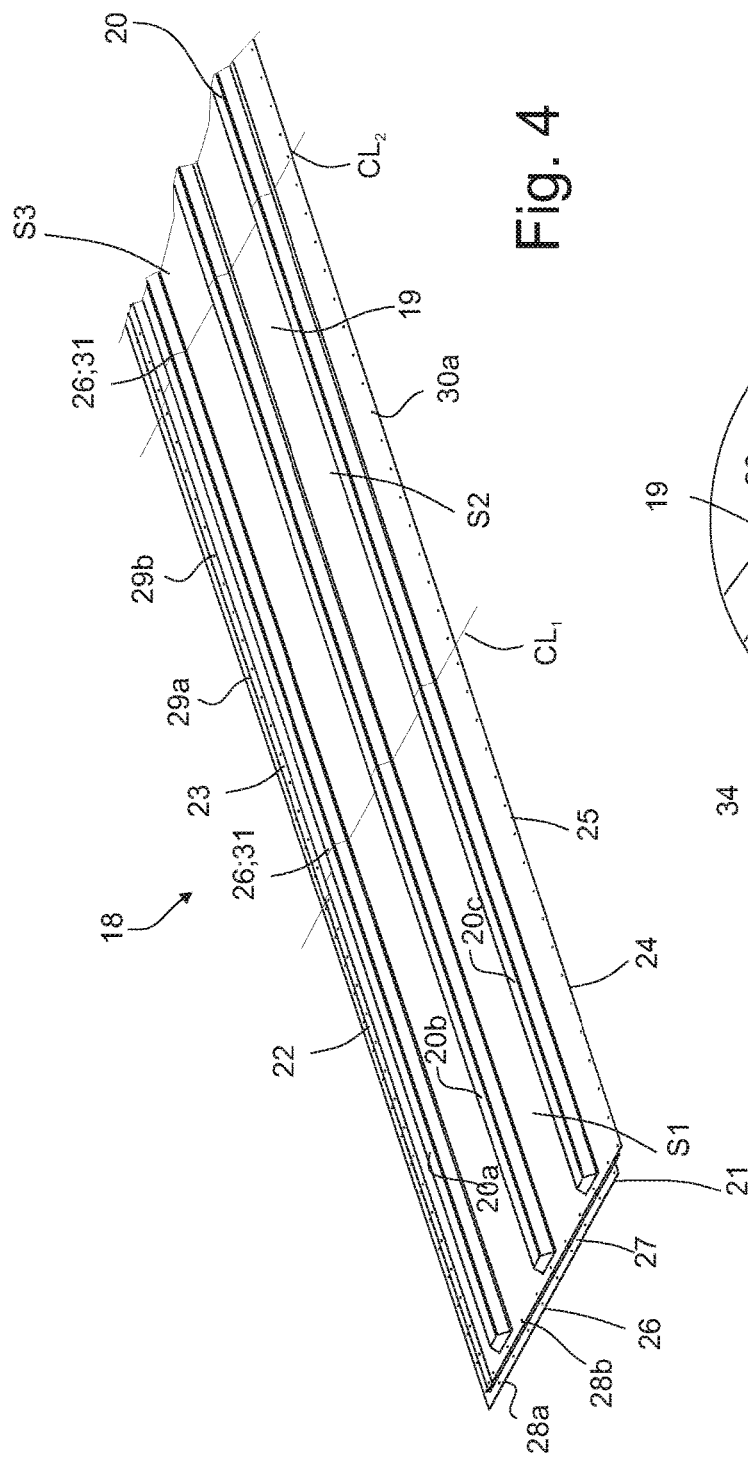
FIG. 4 is a perspective fragmentary view of an elongate composite laminate sheet panel seen from the first face skin.

If the lay-up process is an automatic and continuous method, such as an automated continuous line production using an endless mold structure the method can be performed in accordance with the general steps shown in FIG. 3, however other step sequences and stations may be included, and in different order. For same stations as for the first embodiment of the method same reference numbers are used.

The casting station 1, the demolding station 2, and the first machining station 3 are explained in relation to the first embodiment of a method of the present inventions, as shown in FIG. 1. Additional coupling means, such as adhesive tapes 45 and mechanical fastening means, such as mounting holes and backing means, can be incorporated or applied as described for the first embodiment.

The second embodiment of the method seen in FIG. 3 differs from the first embodiment of the method seen in FIG. 1 in that after the first machining station 3 where first mounting holes 29a,29,30a,30b have been drilled in the opposite second coupling profile 23 and third coupling profile 25, respectively, of the demolded elongate fiberglass/foam sandwich start panel 18, said panel 18 is cut into appropriate sections Sn at cutting section 14 instead of putting the start panel 18 at the panel stock 6. In a modified second embodiment the cutting section 14 is arranged upstream the first machining station 3 so that first mounting holes 29a,29,30a,30b are drilled in each cut section S instead of along the entire length of the start panel 18.

At the subsequent second machining station 15 the panel sub-elements 34 are created by machining the cut sections Sn along their free cut edge(s) 26 to provide said free cut edge(s) with a first coupling profile 27 and/or a fourth coupling profile 32 at opposite ends. Second mounting holes 28a,28b;33a,33b are then drilled at the same second machining station 15, and the panel sub-elements 34 are continuously one after another conveyed through the finishing station 9, the quality check station 16, and then conveyed to the panel sub-element stock 17, where the panel sub-elements 34 are kept until further use, such as when an order is placed for a modular assembly structure, e.g. the nacelle cover 37 seen in FIGS. 8 and 9. In response to such an order the number and kinds of panel sub-elements 34 are picked from the panel sub-element stock 17 and send to the packaging station 11, together with any further sub-components, e.g. the sub-components seen in the subsequent figures, needed for assembling the modular assembly structure 37. Shipping at shipping station 12 and assembling at 13 is performed similarly as described for the first embodiment shown in FIG. 1.

Insertion of backing means 36 can be made integral with step a) at the casting station 1, so that the panel sub-element 34 are "born" with integral backing means 36. At the free cut edges 26 the backing means 36 can be introduced at any stage during the method, even prior to being conveyed to the packing station 11, or as part of the assembling process 13.

The adhesive tape 45 can be added to the demolded start panel 18 at the opposite second 23 and third 25 coupling profiles or be added to the corresponding profiles 27;32 of a cut and/or machined section Sn in a manner as described above, including prior to or after drilling first and/or second mounting holes 29a,29b;30a,30b;28a,28b.

Continuity in the casting step a) can be established by the continuous supply of the fiberglass layers for the skin layers and the core material for the core layer, e.g. by robotic interaction. The casting step a) is started at one end of the endless mold, which end may be closed at start up and opened later once the process is up and running, e.g. on an endless conveying mold band. The layers may be laid-up in many different ways. E.g. the layers may be laid-up slightly offset in time one after another, the first layer being the fiberglass layer on the gel coat and the last layer being yet a fiberglass layer, preferably having another orientation than the first fiberglass layer, with the core layer in-between said opposite fiberglass layers. The stacked layers, which are continuously arranged in the endless mold, may be covered by a top part and proceed through a separate running casting zone where vacuum is applied, resin infused and curing completed. At exiting the running casting zone the cured sandwich laminate structure is demolded, e.g. at the end of the endless conveying mold belt that orbits around rollers. The roller at the end of the endless conveying mold belt turns the mold upside down, and by separating the top part from the bottom part, e.g. the female mold part, the laminate structure drops out simply due to gravity or with the help of pulling. The continuously cast composite laminate panel may then drop onto a cutting table where it is divided into sections that are moved further on in the method, as described above.

FIG. 4 shows in a perspective, fragmentary view, an elongate fiberglass/foam sandwich start panel 18 seen from the first face skin 19, which has reinforcing ribs 20. In the present embodiment three reinforcing ribs 20a,20b,20c are provided along the length of the elongate fiberglass/foam sandwich start panel 18. The first face skin 19 is typically to be the interior face skin of the modular assembly structure. The second face skin 21, opposite the first face skin 19, then becomes the exterior face of the modular assembly structure, e.g. the modular assembly structure 37 seen in FIGS. 7 and 8.

The elongate fiberglass/foam sandwich start panel 18 has a free first elongate edge 22 with a second coupling profile 23 and an opposite parallel second elongate free edge 24 with a third coupling profile 25, and as seen to the left in FIG. 4, a short free edge 26 with a first coupling profile 27. A fragment of the short free edge 26 with the first coupling profile 27 is seen in enlarged scale view in FIG. 7.

At and/or adjacent the first coupling profile 27 are provided at least one row of second mounting holes, optionally more than one row of second mounting holes, such as two parallel rows of second mounting holes 28a,28b.

At and/or adjacent the second coupling profile 23 and the third coupling profile 25 are provided at least one row of first mounting holes, optionally more than one row of first mounting holes, such as two parallel rows of first mounting holes 29a,29b;30a,30b. References are in this respect also made to FIG. 6.

As illustrated by means of cutting lines $CL_1$ and $CL_2$ the elongate fiberglass/foam sandwich start panel 18 are cut into sections S1, S2, . . . , Sn having opposite facing free cut edges 26,31. An elongate fiberglass/foam sandwich start panel 18 having a length L may be divided into n sections S at n−1 cutting lines $CL_{n-1}$. At least one of the cut sections S1 may already have a cast first coupling profile 27, or can be given such by machining. Accordingly, any of the n sections Sn has at least one free cut edge 26;31 that needs machining to create a machined first coupling profile 27 and/or a machined fourth coupling profile 32, and at least one row of third mounting holes, optionally more than one row of third mounting holes, such as two parallel rows of third mounting holes 33a,33b, as seen better in FIGS. 5 and 6. The third mounting holes 33a,33b may be similar to the second mounting holes 28a, 28b.

If the elongate fiberglass/foam sandwich start panel 18 are cut into more than two sections S at least n−2 sections S may require machining to make machined first coupling profiles 26 and opposite fourth coupling profiles along both the respective opposite free cut edges 26;31. Both opposite machined first and fourth coupling profiles 27;32 may have same profile, or said profiles may be different. Once the machined first and fourth coupling profiles 27,32 have been added to the section, and optionally also the second mounting holes 28a,28b;33a,33b, an at least partly finished panel sub-element 34 has been created.

Furthermore, during assembling 13 of the modular assembly structure 37, and depending of how a panel sub-element 34 is orientated, the second coupling profile 23 may constitute the third coupling profile 25, and the second mounting holes 28a,28b may constitute the third mounting holes 33a,33b. Furthermore a cast first coupling profile 27 may have substantially similar cross-section as a machined first coupling profile 32, or a different cross-section.

Figure 7:
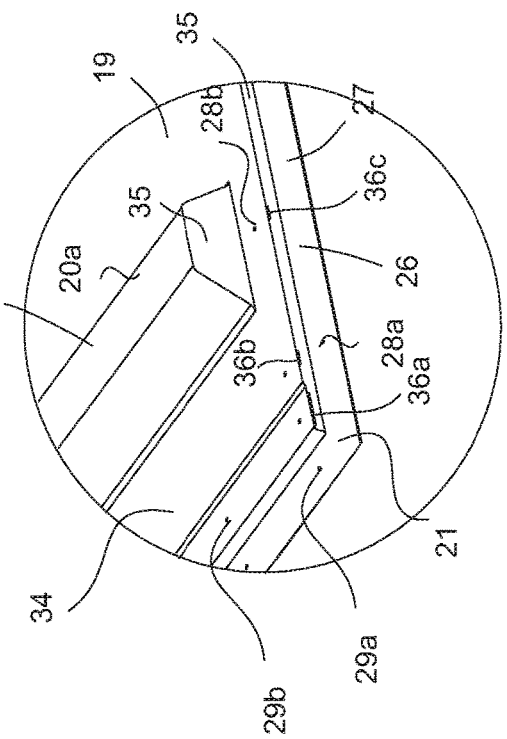
FIG. 7 shows, in an enlarged scale, the detail of the panel-sub-element encircled in FIG. 5.
Figure 5:
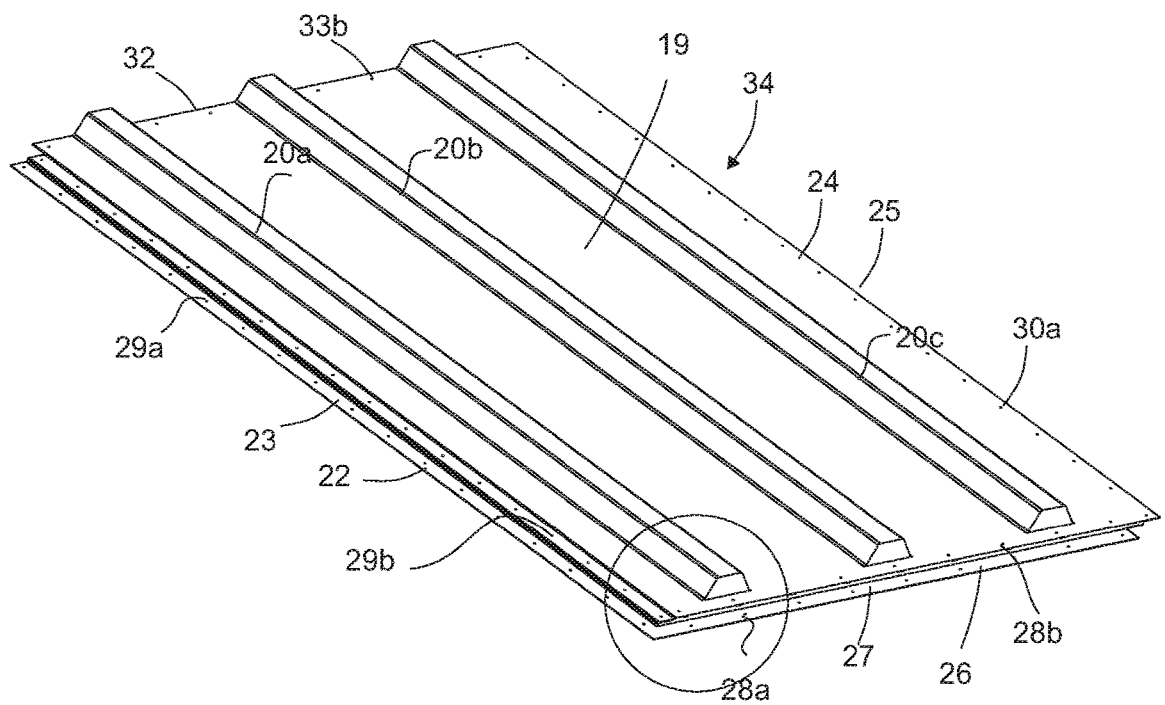
FIG. 5 is a perspective view of a panel sub-element element cut from the elongate composite laminate sheet panel shown in FIG. 1, and seen from the first face skin intended for being the interior face skin of the assembled modular assembly structure.
Figure 6:
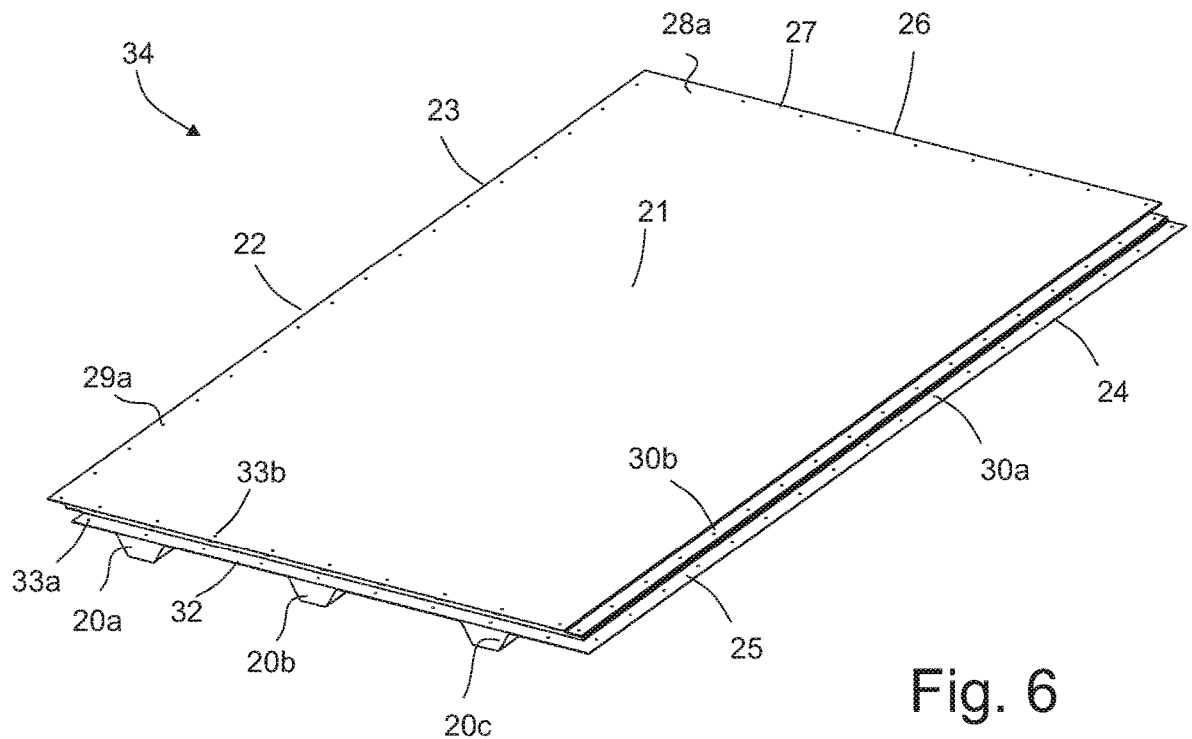
FIG. 6 shows the same seen from the opposite second face skin intended for being the exterior face skin of the assembled modular assembly structure.

FIG. 7 shows, in enlarged scale, the detail encircled in FIG. 5 of the panel sub-element 34 seen from the first face skin 19. Between the first face skin 19 and the second face skin 21 is provided a core 35, e.g. a foam core. A backing means 36 in form of clips or metal plates 36a,36b,36c, of which only three are visual in FIG. 7, are inserted in the core 35 below first mounting holes 29b of the second coupling profile 23 and below second mounting holes 28b of the first coupling profile 27. The first coupling profile 27 thus includes a protrusion of the first face skin 19, which corresponds to the long leg of an L. The short leg of said L is mostly the core 35, which has been exposed after machining, which short leg terminates in the second face skin 21. The long leg of the L-protrusion backs the clips 36 inserted in the foam core. An inner row of second mounting holes 28b penetrates the second face skin 21 and the core 35 but not the first face skin 19. An outer row of second mounting holes 28a penetrates the first face skin 19. All coupling profiles 23,25,27,32 have similar arrangement of inner row of mounting holes with backing means, prepared so that fastening means, such as pop rivets, passing into the core does not compress the core or makes a critical impact on the face skins. All coupling profiles 23,25,27,32 also have exterior rows of mounting holes through the protruding face skin. The reinforcing rib 20 also has a core 35, so that these ribs 20 are rather lightweight and not add substantial weight to the panel sub-element 34.

FIG. 8 shows, in perspective, and in an exploded view, the main components for building, by assembling of the panel sub-elements 34 manufactured by the method of the present invention, a modular assembly structure, in form of a nacelle cover 37. FIG. 9 is a perspective view of the assembled nacelle cover 37.

The 3-Dimensional overall structure of the nacelle cover 37 manufactured in accordance with the present invention is an oblong box, shaped substantially as a rectangular cuboid.

Conventionally a nacelle cover is aerodynamically shaped, at least to some extent, and making said nacelle cover very edged and cuboid, as in the present invention, may take away some of the aerodynamically properties, which is normally not something looked for in respect of a functional, aesthetic, and normative nacelle cover.

As is illustrated in FIGS. 8 and 9 some additional sub-components and fittings are needed for the assembling of the nacelle cover 37. Because the nacelle cover 37 must house a high number of common components, including e.g. a hub, rotor, gearbox, generator, inverters, hydraulics, and bearings internally and externally. The nacelle cover must also be adapted with e.g. fittings for connecting with such other common components. The most important inner equipment of the turbine's nacelle sits behind the hub and includes the yaw system, main-shaft bearing, gearbox, generator, and electrical control cabinet. These components are normally mounted on a structural metal frame assembly where the front frame part carries the yaw system, gearbox, and main shaft and the rear frame part carry the generator, transformer, and electrical cabinets. The entire structural metal frame assembly is attached, e.g. by means of brackets, typically to the sides of the nacelle cover, and a nacelle cover assembled of panel sub-elements and further sub-components in accordance with the present invention is also arranged for connecting such components and equipment. So when designing and manufacturing the panel sub-elements 34 in accordance with the present invention for a modular assembly structure, such as the modular built nacelle cover 37, the design of the panel sub-elements 34 is prepared for capturing and carrying all systems, subsystem, and component requirements needed for the nacelle to be operative, as for any known nacelle design.

As is clear from FIG. 8 the dimensions of the nacelle cover 37 is substantially given by the dimensions of the panel sub-elements 34. For the sake of over-viewing the many details of FIG. 8 only some of the reference numbers are inserted.

The embodiment of the nacelle cover 37 seen in FIG. 8 has opposite elongate parallel sides and opposite parallel short ends. The length of the elongate long parallel sides corresponds substantially to five times the width of a basic panel sub-element 34. These panel sub-elements are named side panel sub-elements 34. One basic side panel sub-elements 34 has been divided lengthwise into two side panel sub-element parts, a first narrow side panel sub-element part 34' used at the front of the nacelle cover 37, and a second wider side panel sub-element part 34" constituted by the rest of the basic side panel sub-element 34 are used to complete the long side at the rear end of the nacelle cover 37. The first narrow side panel sub-element part 34' and the second side panel sub-element part 34" are provided with suitable coupling profiles to couple with the adjacent basic side panel sub-elements 34, as well as to other sub-components, as will be described further below. The widths of first narrow side panel sub-element part 34' and second side panel sub-element part 34" are selected in accordance with other requirement, so as e.g. structural strength, mounting of internal mechanical and electrical components, and in order for adapting to any other requirements. So by simply cutting and machining the basic panel side sub-element part 34, the design of the nacelle cover can be adapted to almost any requirements. The roof panel sub-elements and bottom panel sub-elements are made in a similar manner, so basically long side panels, roof panel, and bottom panel are assembled in a similar manner. The rear panel and the front panel are also made from similar panel sub-elements.

In the present embodiment a second coupling profile 23 mates with a third coupling profile 25, and the reinforcing ribs 20 faces inside the nacelle cover 37. The first and fourth coupling profiles may be of same kind at both ends of a panel sub-element 34 or be different, e.g. be like the second coupling profile 25 at one end, and as the third coupling profile at the other end. Also, panel sub-elements 34 having second coupling profiles 25 as both the free first edge 22 and the free second edge 24 may be used alternate with sub-elements 34 having third coupling profiles 26 as both the free first edge 22 and the free second edge 24.

The panel sub-element 34 of the present invention represents the basic panel sub-element 34 of the nacelle cover 37 in a plurality of standard dimensions. A few further panel sub-elements 34a may be needed for coupling with e.g. the tower of a windmill, the rotor, etc. as e.g. seen at the bottom and to the right in FIG. 8.

The second panel sub-elements 34a has similar length and width as the basic panel sub-elements 34 but differs in that they does not have reinforcing ribs 20 and is provided with a cut out half-circular section 38. Such a half-circular cut-out section 38 can be cut, milled and/or otherwise machined to any size and shape needed for coupling the nacelle cover 37 together with other equipment, such as tower, hub and shaft. Two such second panel sub-elements 34a delimit an opening 39 for such equipment. The present embodiment of a nacelle cover has two such openings 39, an end panel opening 39a and a bottom panel opening 39b, which panel openings 39a,39b are created from second panel sub-elements 34a, that also have standard sizes, as to width and length corresponding to the reinforced basic panel sub-elements 34, so that second panel sub-elements 34a can mate side-to-side with basic panel sub-elements 34 if needed, or so that two second panel sub-elements 34a can mate together to form a firm joint. In an alternative embodiment of second panel sub-elements 34a, such second panel sub-elements 34a can have reinforcing ribs.

If e.g. the width of a panel sub-element 34 is half its length even more combination options are available and spatial arrangement possible.

The panel sub-elements 34,34a are assembled into the 3-Dimensional structure of the nacelle cover 37 by means of sub-components, including but not limited to angle profiles 40 and corner profiles 41. The angle profiles 40 can be extruded and made of fiber-reinforced plastic, preferably the same material as the face skins 19,21 of the composite laminate, or be cast similar to the panel sub-elements. The corner profiles 41 may be cast in a mold.

When an order is given for an individually design of a modular assembly structure, such as the nacelle cover shown in FIGS. 8 and 9, e.g. via data input to the interactive software module, the software module configures the ordered nacelle cover 37 and calculates the number and kinds of panel sub-elements 34 and further sub-components required. Then the correct number of standard panel sub-elements 34 at stock is collected, or said number of standard panel sub-elements are cut from elongate composite laminate sheet panels and machined to make the remaining coupling profiles and mounting holes.

Final machining must sometimes be made, so as e.g. to make any openings 39 of appropriate kind of second panel sub-elements 34a. Angle profiles 40a,40b may be cut to suitable lengths or collected from stock at suitable lengths ready-to-use. For the present embodiment a first angle profile 40a has a length corresponding to the length of a panel sub-element 34 and a second angle profile 40b has a length corresponding to five times the width of a panel sub-element 34. For the present embodiment of a nacelle cover eight corner profiles 41 are needed. Furthermore, for internal, assembling and reinforcement, a plurality of sub-components in form of brackets are provided, as will be explained in further details with reference to FIGS. 14-20.

In FIG. 9 the assembled nacelle cover 35 is turned 90° in relation to the orientation shown in FIG. 8 to illustrate that a panel sub-element 34 may be provided with a hatch 42 for access for maintenance, surveillance, and repair of the nacelle's internal mechanical and electrical components, including checking of the joints of the nacelle cover. A panel sub-element 34 with a hatch 42 may be a standard panel sub-element 34 at stock or manufactured to order, e.g. from a panel sub-element 34.

The first 40a and second angle profiles 40b and the corner profiles 41 are preferably assembled with panel sub-elements 34,34a by blind fasteners, e.g. pop rivets 43 as shown in FIG. 10.

Pop riveting is a preferred technique for joining and assembling adjacent panel sub-elements 34;34a, as well as assembling panel sub-elements 34 with other sub-components. Pop rivets are preferred additional coupling means for the present invention. A head of the pin may be pulled through the rivet and as this happens the end of the pop rivet 43 is deformed slightly and expands so that it joins the backing means, thus the backing metal clip 36. The pop rivet 43 holds e.g. the overlapping coupling profiles of two opposite panel sub-elements 34 firmly together. Mechanical fastening means, such as e.g. pop rivets, may be pulled into the respective mounting holes from both inside the nacelle cover and from outside the nacelle cover.

The assembled nacelle cover 37 has a first long side panel 54 opposite a second long side panel 55, a roof panel 56, a bottom panel 57, a front panel 58 and a rear panel 59.

As seen in FIG. 10 the protruding section 44 of the first face skin 19 of the second coupling profile 23 of a respective panel sub-element 34 overlap the second face skin 21 of the adjacent panel sub-element 34 on the exterior side so that the first mounting holes 29a of the second coupling profile 23 are aligned with the first mounting holes 30b of the third mounting profile 25.

The clip 36, which is shown in enlarged scale view in FIG. 11, has a long plate segment 36a and a short plate segment 36b. The long plate segment 36a is inserted between a respective first face skin 19 and the core 35 so that the short plate segment 36b abuts on the free end of the protruding section 44, thereby ensuring the position of the clip 36. The long plate segment 36a then serves as a backing means 36 for the pop rivet 43, which is mounted through aperture 46 in the long plate segment 36b. An adhesive tape 45 is applied on the interior face of the protruding section 44 as a further additional coupling means in addition to the mechanical fastening means represented in this embodiment by the pop rivets 43 through the first mounting holes.

FIG. 12 shows a perspective fragment of a substantially U shaped angle profile 40, which is seen from the end in FIG. 13. The angle profile has a first angle profile side 47 that at substantially right angle α extends into an opposite second angle profile side 48 via central angle profile 49. The angle profile 40 that has profile sides 47,48 arranged at right angle serve to couple e.g. the side panel sub-elements 34 to the roof panel sub-elements and the bottom panel sub-elements of the cuboid nacelle cover 37. Other angles between profile sides 47,48 of the angle profile 40 may be used for making other 3-Dimensional larger structures of panel sub-elements. For example can an angle profile having an angle α of 135° and an angle profile having an angle α of 45° be used to connect a 45° inclined roof to opposite sides of a not-cuboid larger structure. It should be understood that the angle α of an angle profile according to the present invention is not limited to 90°, but can be any angle between e.g. 45° and 135°.

The first angle profile side 47 has a fifth coupling profile 50, and the opposite second angle profile side 48 has a sixth coupling profile 51, which fifth and sixth coupling profiles 50,51 e.g. may have the same cross-section as one of the first coupling profile 27, the second coupling profile 23, the third coupling profile 25 and the fourth coupling profile 32 in order to mate one of these coupling profiles. The angle profile 40 may be turned in space so that the appropriate fifth or sixth coupling profile is presented to a mating coupling profile on the panel sub-element.

For most embodiments of the present invention two different cross-sectional shapes of coupling profiles suffice for coupling panel sub-elements 34 and angle profiles 40 together. For example the second coupling profile 23 of the panel sub-element 34 may have the same cross-section as the sixth coupling profile 51 and the fourth coupling profile have the same cross-section as the fifth coupling profile 51. Like the panel-sub-element 34 the angle profile has premade mounting holes at predetermined positions corresponding to those for the panel sub-elements 34,34a. For the present embodiment of an angle profile 40, the first angle profile side 47 has two parallel rows of fourth mounting holes 52a,52b and the second angle profile side 48 has two parallel rows of fifth mounting holes 53a,53b.

The corner profile 41 is shaped like a cap to hide assembling at corners. Optionally the corner profile is a simple mold structure of composite laminate shaped complementary to a corner where more than two panel sub-element and/or angle profiles meet.

FIG. 14 is a view inside the nacelle cover 37 shown in FIG. 9 and orientated as in FIG. 8. The first long side panel 54 of panel-sub-elements 34 have been removed to illustrate the assembling of the nacelle cover 37 from inside the nacelle cover 37.

The joint of two panel sub-elements 34 is achieved from outside the nacelle cover 37 by means of an angle profile 40. The joint is reinforced from inside the nacelle cover 37 by means of first brackets 60 where reinforcing ribs 20 are in extension of each other, thus where reinforcing ribs 20 are arranged aligned end towards end, as is the situation where e.g. the opposite long side panels 54,55 are joined with a roof panel 56 and a bottom panel 57. An exemplary first bracket 60 is seen in FIG. 15.

Second brackets 61 are used where reinforcing ribs 20 of one panel sub-element 34 are arranged perpendicular to the length of the reinforcing ribs 20 of the another panel sub-element 34 to be joined with the first one, as is the situation when e.g. the rear panel 59 and the front panel 58 is assembled with the roof panel 56 and the bottom panel 57. An exemplary second bracket 60 is seen in FIG. 16.

Figure 17:
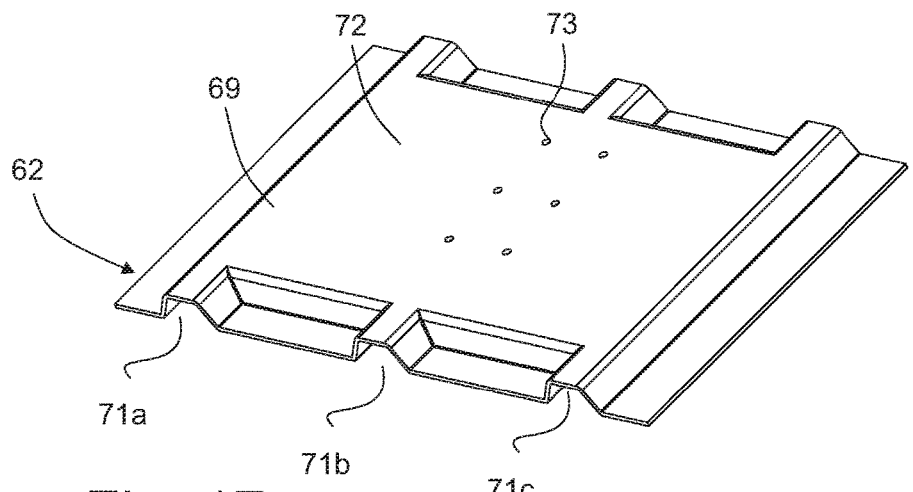
FIG. 17 is a perspective view of a frame bracket seen from the face facing inside the nacelle cover.
Figure 18:
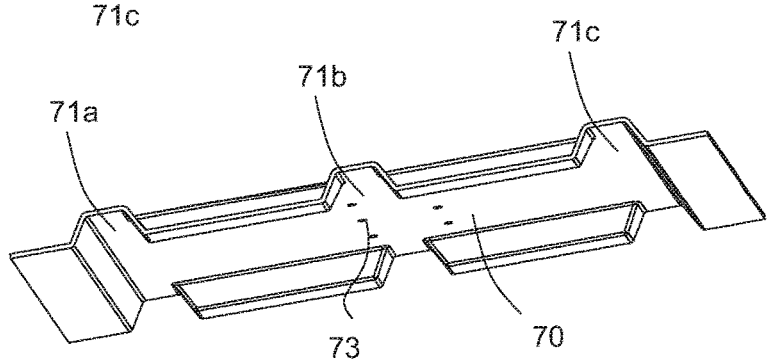
FIG. 18 shows the same seen from the opposite face.

Frame brackets 62 configured to secure the metal frame (not shown) that carries the nacelle operative equipment (not shown) is secured spaced apart to the long side panels 54,55. In the present example three, spaced apart frame brackets 62 are illustrated on the second long side panel 55. The first long side panel may be similarly equipped and the positions of the frame bracket may vary depending on the configuration of the metal frame. An exemplary frame bracket 62 is seen in FIGS. 17 and 18.

Furthermore, the bottom panel opening 39b has an inward facing annular collar 63 provided for facilitating securing of the nacelle to the tower of the wind mill (not shown). The annular collar 63 may be provided in form of a long strip of composite laminate panel bend into ring-shape and then inserted into a circumferential recess or groove (not shown) around the bottom panel opening 39b, e.g. a cut or milled groove having a width corresponding substantially to the thickness of the collar to allow insertion into more or less firm engagement of said collar. The strip for the annular collar 63 can be of any suited material, including but not limited to the same material as the panel sub-elements are made, just be fiber-reinforced composite laminate without core, or be made of metal. The front panel opening 39a may, although not visible in FIG. 14, be similarly provided with a suitable inwards or outwards facing annular collar 63 for securing a spinner cover (not shown) to the nacelle cover 37.

In FIG. 15 the first bracket 15 is seen from the face that faces inside the assembled nacelle cover 37. The first bracket 60 is configured with a curved, substantially U-shaped profile, to accommodate the orthogonal reinforcing ribs 20 of joining panel sub-elements 34. To that aspect the first bracket has three bracket legs: a first bracket leg 65, that extends into a second bracket leg 65, which second bracket leg 65 extends into a third bracket leg 66. The first bracket leg 65 and the third bracket leg 66 are shaped complementary to a reinforcing rib 20, to fit closely around such a reinforcing rib 20. The second bracket leg 65 rests abuttingly on the central angle profile 49 of said angle profile 40 once the first bracket leg 65 and the third bracket leg 66 is arranged on the opposite reinforcing ribs 20, thus the reinforcing ribs 20 that extends in lengthwise direction of each other at substantially right angle due to the associated panel sub-elements 34 being joined by the angle profile 40. Thus a first bracket 60 is sized and dimensioned to conform to an internal angle where the angle profile 40 has been used to substantially orthogonally couple panel sub-elements 34 so that the reinforcing ribs 20 runs the same way.

In FIG. 16 the second bracket 16 is seen from the face that faces the panel sub-elements to visualize the groove 68 for accommodating the protruding reinforcing rib 20. The second bracket 61 differs from the first bracket 60 mainly in not having a third bracket leg 67 to allow panel sub-elements 34 to be assembled so that reinforcing ribs of the joined panel sub-elements 34 are substantially orthogonal.

The frame bracket 62 is seen in FIG. 17 in perspective from the first face 69 that faces inside the assembled nacelle cover 37, and in FIG. 18 from the second face 70 that faces against the panel sub-elements 34.

The frame bracket 62 spans three reinforcing ribs 20 of adjacent, assembled panel sub-elements 34 or of a single panel sub-element 34. To that aspect the frame bracket has three parallel tracks 71a,71b,71c of cross-sections complementary to the cross-sections of the reinforcing ribs 20 to be accommodated in the tracks. The first face 69 of the frame bracket 62 provides a first bearing surface 72 for the metal frame (not shown) and seventh mounting holes 73 for securing said frame to e.g. side panels 54,55.

The first brackets 60, the second brackets 61, the frame bracket 62 and the corner brackets 64 can be secured by means of adhesive means and/or mechanical fastening means, as described above, and have mounting holes (not shown) for using said mechanical fastening means. Furthermore, the first brackets 60 and the second brackets 61 may have at least one leg that has a cross-section complementary to the cross-section of a reinforcing rib. If e.g. the reinforcing rib has a convex exterior surface the corresponding bracket leg is concave to receive the convex reinforcing rib 20.

Figure 19:
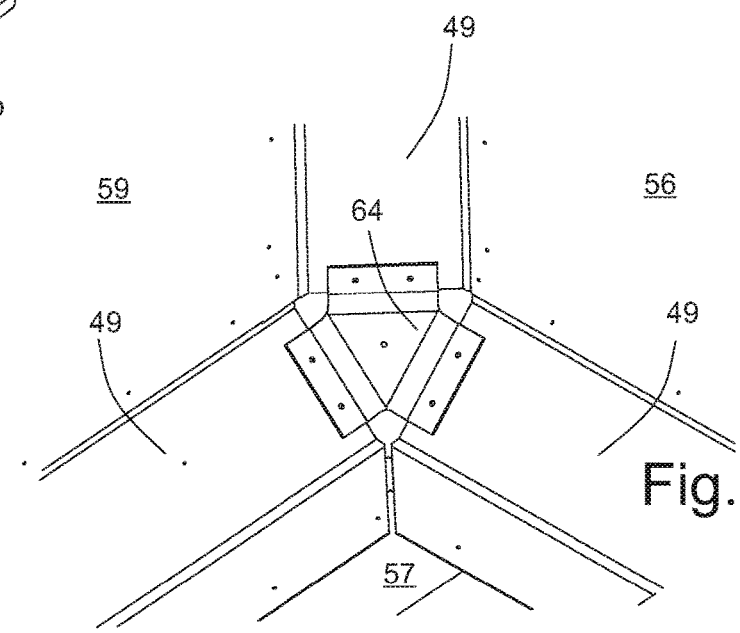
FIG. 19 is the encircled view in FIG. 14 of an interior corner, which has been created by assembling three panel sub-elements by means of angle profiles.

As illustrated in FIG. 19, that shows the interior corner encircled in FIG. 14, corner brackets 64 are used from inside the nacelle cover 37 as backing and closure when a corner profile 41 is mounted from outside the nacelle cover 37 to terminate and close off at the joint of three corners of three joined panel sub-elements 34.

Figure 20:
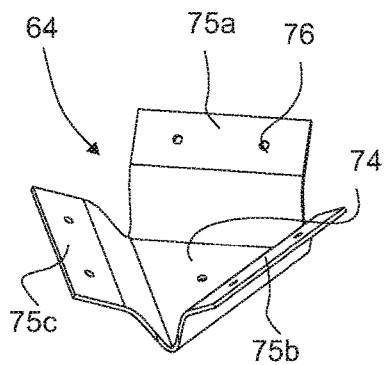
FIG. 20 is a perspective view of a corner bracket seen from the face facing inside the nacelle cover.

An exemplary embodiment of a corner bracket 64 is illustrated in perspective view in FIG. 20. The corner bracket 64 has an equilateral triangular second bearing surface 74 that fits inside an interior corner, as illustrated in FIG. 19, so that three outwards curved webs 75a,75b,75c, that extend from the respective sides of the triangle can be secured to a respective central angle profile 49 of an angle profile 40. The corner bracket 64 can have other design and length and the curvature of the webs 75a,75b,75c should not be construed as limiting the present invention. Eights mounting holes 76 serve for securing the corner bracket inside the nacelle cover in the manner described above.

The angle profiles 40, the corner profiles 41, the first brackets 60, the second brackets 61, the corner brackets 64, the frame brackets 62 and the annular collars 63 may all be sub-components made as mold sub-components of the same composite laminate sandwich structure as the panel sub-elements 34, or just be made of fiber-reinforced composite laminate without core. In particular one or more of the sub-components in form of the first brackets 60, the second brackets 61, the corner brackets 64, and the frame brackets 62 can in the alternative also be made of metal, e.g. of metal plate, due to having uniform thickness.

Emphasis is made that any fee edge of a panel sub-element 34 can have a machined coupling profile or a separate coupling profile fastened to any free edge of the panel sub-element 34 that is made without a machined of mold coupling profile. When a separate coupling profile is used the sections Sn cut from the elongate composite laminate sheet panel may be a sheet panel in itself, which sheet panel can have at least one straight edge, but more than one straight free edge it within the scope of the present invention.

Figure 23:
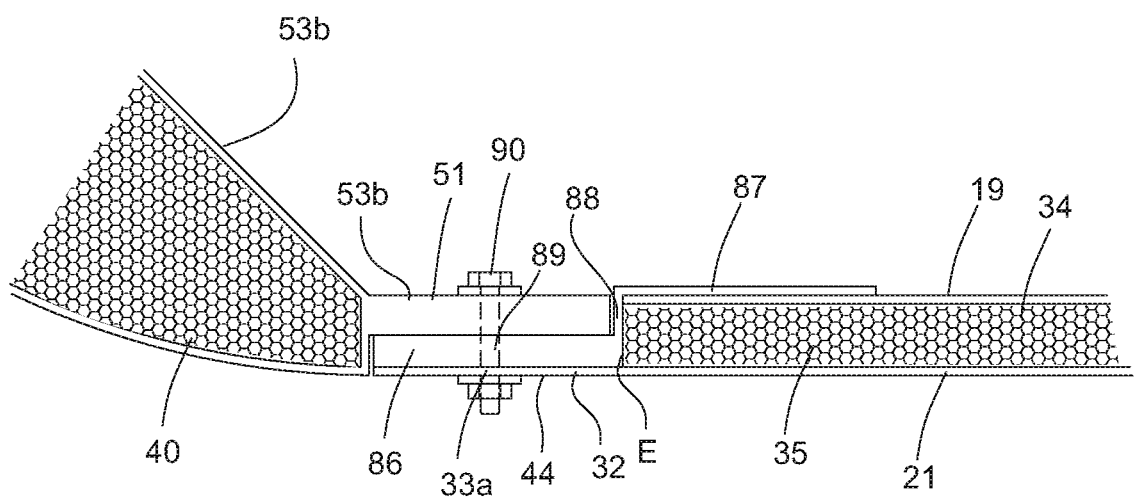
FIG. 23 is a sectional view taken through an alternative joint between a panel sub-element and an angle profile.

In the views of FIGS. 21-23 discussed below only the fragment of the separate coupling profile used to couple with the panel sub-element is shown. Thus the sectional profile of the coupling profile is not shown in FIGS. 21-23.

FIG. 21 is a sectional view taken through a first embodiment of a joint between a free edge E of a panel sub-element 34 and a separate coupling profile 77, where the free edge E is straight and does not have a pre-made coupling profile 23,25,27,32 made during the casting, nor a machined coupling profile 23,25,27,32. As shown in FIG. 21 the opposite panel sub-elements 34 to be joined have opposite straight free edges E that are brought together by means of a first embodiment of a fastening profile 78 that has an H-shaped cross-section and is fastened to the panel sub-elements by means of an adhesive means, e.g. glue or adhesive tape, optionally also by means of a mechanical fastening means. The first fastening profile 78 with H-shaped cross-section can also be used as an interposed means for assembling two opposite panel-sub-elements 34 having straight free edges to be joined. The opposite substantially parallel fastenings legs 79a,79b,79c,79d protrude from bridge member 80 of the H-shaped first fastening profile 78. The fastenings legs 79a,79b,79c,79d may, if expedient, converge slightly to also clamp slightly around the straight free edge E.

FIG. 22 is a sectional view taken through a second embodiment of a joint between a straight free edge E of a panel sub-element 34 provided with a second embodiment of a fastening profile 81. The second embodiment of a fastening profile 81 corresponds substantially to the first fastening profile 78, but differs in only having one fastening leg 82 that protrudes from the bridge member 80. The second embodiment of a fastening profile 81 has the cross-section of bifurcated forge and an eight mounting holes 83 through the fastening leg 82. Second fastening profiles 81, which are mounted e.g. by using an adhesive means on opposite straight free edges E of any of sections Sn, panel sub-elements 34, and coupling profiles 23,25,27,32, respectively, can be arranged in overlapping relationship, so that axially aligned eight mounting holes 83 can receive a bolt means 84 or pop rivets, to join the two adjacent elements firmly.

FIG. 23 is a sectional view taken through an alternative joint between a panel sub-element 34 having a coupling profile 23,25,27,32 and the angle profile 40 with fifth mounting holes 53a,53b, as shown in FIGS. 12 and 13. For the description of FIG. 23 it is assumed that the coupling profile is a machined fourth coupling profile 32 having fourth mounting holes 33a, 33b.

The machining of step d) has exposed the core 35, which exposure constitutes a prejudice within e.g. the art of manufacturing nacelle covers in general. The machining has also left a protruding section 44 of the exterior face skin 21, thus the second face skin, free to protrude beyond the free straight edge E, which protruding section 44 has second mounting holes 33a. In view of covering the exposed core 35 at a free edge E a stepped insert 85 is provided. Using the orientation seen in FIG. 23 the lower leg 86 of the stepped insert 85 extends at right angle into upper step 87 via riser 88. The lower leg 86 is arranged on top of the protruding section 44 of the fourth coupling profile 32 so that a ninth mounting hole 89 is axially aligned with a second mounting hole 33a of said fourth coupling profile 32. The lower leg 86 extends at right angle into upper step 87 via riser 88 so that the riser 88 abuts the straight free edge E, and so that the upper step 87 is arranged on top of the first face skin 19. The sixth coupling profile 51 of the angle profile 40 has fifth mounting holes 53a axially aligned with the second mounting holes 33a and the ninth mounting hole 89 to receive a second bolt means 90 or pop rivets through said axially aligned mounting holes for firm securing of angle profile with panel sub-element 34, as shown in FIG. 23, or with a separate coupling profile that are connected to a panel sub-element having straight edges.

The result of the present invention is e.g. a unique nacelle cover design differentiated from others in the market by being made up of sets of standard size and standard shape sub-elements and optional sub-components, thereby providing a high and superior degree of structuring and assembling options. The nacelle cover manufactured of standard size and standard shape sub-elements and optional sub-components can be used with known internal and external structures of a nacelle, and is provideable at very competitively low prices.

What is claimed is:

1. A method of manufacturing composite laminate panel sub-elements for subsequent assembling into a modular assembly structure comprising the preprocessing steps of
    a) casting an elongate composite laminate sheet panel having opposite first and second fiber-reinforced plastic exterior face skins sandwiching a foam core, a free first elongate edge and an opposite free second elongate edge, the first elongate edge being provided with a cast second coupling profile produced in casting step a) as an integral part of the panel, the second coupling profile extending along an entire length of the first elongate edge, and the second elongate edge being provided with a cast third coupling profile produced in casting step a) as an integral part of the panel, the third coupling profile extending along an entire length of the second elongate edge,
    b) demolding the elongate composite laminate sheet panel,
    c) transversely cutting the demolded elongate composite laminate sheet panel into a plurality of panel sub-elements by cutting along a cutting line extending along an entire length between the first and second elongate edges, thereby providing each of the panel sub-elements with at least one free cut edge, a free first edge comprising a part of the first elongate edge and having the same second coupling profile as the free first elongate edge, and a free second edge comprising a part of the second elongate edge, the free second edge being parallel to the free first edge and having the same third coupling profile as the second elongate free edge, wherein the at least one free cut edge extends along an entire length between the free first and second edges and
    d) providing at least one of the at least one free cut edge with at least a first coupling profile, wherein the first coupling profile extends along an entire length of the respective free cut edge,
    wherein step d) is performed by machining the first coupling profile along the entire length of the respective free cut edge produced as a result of cutting the demolded elongate composite laminate sheet panel into the plurality of panel sub-elements, and
    wherein the foam core bonds between the first and second skins to achieve the composite laminate.

2. A method according to claim 1, wherein step d) is performed in a separate step after step c) or simultaneous with step c).

3. A method according to claim 1, wherein at least one of the panel sub-elements has two opposite free cut edges, one of which is machined with theft first coupling profile along the entire length of the respective free cut edge and the other of which is machined with a fourth coupling profile along the entire length of the respective free cut edge, wherein the first coupling profile and the fourth coupling profile have has the same or different cross-section profile.

4. A method according to claim 3, wherein the method comprises one or more further step(s) f) of providing at least one additional coupling means to any of the first coupling profile, the second coupling profile, the third coupling profile, and/or the fourth coupling profile, wherein step f) is performed in step a), after step b) and prior to step c), and/or after step d).

5. A method according to 4, wherein the at least one additional coupling means is selected from the group comprising adhesive means, optionally an adhesive tape, and/or mechanical fastening means, optionally the mechanical fastening means includes mounting holes for receiving blind fastener and/or backing means for the blind fasteners, and combinations of these additional coupling means.

6. A method of assembling the panel sub-elements manufactured by the method according to claim 5, wherein the mechanical fastening means comprise blind fasteners or screws.

7. A method according to claim 4, wherein the at least one additional coupling means of a respective coupling profile is/are provided in step f):
    by drilling mounting holes in the coupling profile, first mounting holes are drilled in the second coupling profile of the free first elongate edge and/or in the third coupling profile of the opposite free second elongate edge prior to step c), and/or
    second mounting holes are drilled in the first coupling profile and/or third mounting holes are drilled in the fourth coupling profile after step c), and/or
    the at least one additional coupling means is/are provided in form of a backing means provided at locations selected to be below a mounting hole during assembling of the panel sub-elements, and/or
    the at least one additional coupling means is/are provided in form of an adhesive tape along the respective coupling profile either before or after drilling the mounting holes.

8. A method of assembling the panel sub-elements manufactured by the method according to claim 7, wherein the assembling method comprises
    providing the panel sub-elements,
    in case at least one of the coupling profiles has an additional coupling means in form of an adhesive tape removing any protective liner, if a backing means are not already provided, providing the at least one coupling profile with a backing means at assembling locations where mechanical fastening means are to be inserted through mounting holes, arranging the coupling profiles of adjacent panel sub-elements in overlapping relationship, securing the coupling profiles to each other by means of the additional coupling means, optionally applying a joining pressure, further optionally injecting glue in a joint between overlapping coupling profiles either prior to or after securing the adjacent coupling profiles to each other by means of the additional coupling means.

9. A method according to claim 1, wherein
the second coupling profile and the third coupling profile have the same or different cross-section profile.

10. A method according to claim 9, wherein a coupling profile is L-shaped, wherein a short leg of the L exposes the core and a long leg of the L is a protruding single fiber-reinforced plastic face skin, or a coupling profile is a key protruding between the first fiber-reinforced plastic face skin and the second fiber-reinforced plastic face skin or a slot between the first fiber-reinforced plastic face skin and the second fiber-reinforced plastic face skin.

11. A method according to claim 1, wherein the elongate composite laminate sheet panel manufactured in step a) and b) is straight between the free first elongate edge and the opposite free second elongate edge.

12. A method according to claim 1, wherein at least the preprocessing steps a), b) and c), are performed in a continuous line production process.

13. A method according to claim 12, wherein step d) is performed in the continuous line production process.

14. A method according to claim 1, wherein the method further comprises step e) of storing the panel sub-elements as intermediate panel products for subsequent assembling, or storing the elongate composite laminate sheet panel as an intermediate panel product prior to the cutting into the panel sub-elements in step c).

15. A method according to claim 1, wherein the coupling profile made by machining in step d), is created by removing one or more of
at least an edge section of the first fiber-reinforced plastic face skin, and/or
at least an edge section of the second fiber-reinforced plastic face skin, and/or
at least some of an edge section of the core, and/or
an edge section of the core between the first fiber-reinforced plastic face skin and the second fiber-reinforced plastic face skin,
and combinations thereof.

16. A method according to claim 1, wherein the elongate composite laminate sheet panel has one or more reinforcing ribs along the length, optionally the reinforcing ribs protrude from only one side of the elongate composite laminate sheet panel.

17. A method according to claim 1, wherein the composite laminate is a fiberglass/foam sandwich laminate, wherein the foam constitutes the core and the fiberglass constitutes the first fiber-reinforced plastic face skin and the second fiber-reinforced plastic face skin that sandwich the core.

18. A method according to claim 1, wherein the method includes providing an interactive software module adapted for designing the modular assembly structure from a number of panel sub-elements, so that the modular assembly structure comply with set criteria, wherein the majority of the panel sub-elements have standard size and standard shape.

19. A method according to claim 1, wherein the method further comprises one or more of
the casting of step a) is performed inside a female mold, optionally a female mold covered by a top part during casting, optionally the mold is a continuous mold, and
the machining step d) includes one or more of drilling, milling and/or cutting, or combinations of these machining methods.

20. A method according to claim 19, wherein the female mold is a mold part configured to mold reinforcing ribs.

21. The method of claim 7, further comprising interconnecting the laminate panel sub-elements directly or via sub-components, selected from an angle profile, a corner profile and/or a bracket, to form a nacelle cover assembled from the laminate panel sub-elements.

22. A method of manufacturing composite laminate panel sub-elements for subsequent assembling into a modular assembly structure comprising the preprocessing steps of
a) casting an elongate composite laminate sheet panel having opposite first and second fiber-reinforced plastic exterior face skins sandwiching a foam core, a free first elongate edge and an opposite free second elongate edge, the first edge being provided with a cast second coupling profile produced in casting step a) as an integral part of the panel, the second coupling profile extending along an entire length of the first elongate edge, and the second elongate edge being provided with a cast third coupling profile produced in casting step a) as an integral part of the panel, the third coupling profile extending along an entire length of the second elongate edge,
b) demolding the elongate composite laminate sheet panel,
c) transversely cutting the demolded elongate composite laminate sheet panel into a plurality of the panel sub-elements by cutting along a cutting line extending along an entire length between the first and second elongate edges, thereby providing each of the panel sub-elements with at least one free cut edge, a free first edge comprising a part of the first elongate edge and having the same second coupling profile as the free first elongate edge, and a free second edge comprising a part of the second elongate edge, the free second edge being parallel to the free first edge and having the same third coupling profile as the free second elongate edge, wherein the at least one free cut edge extends along an entire length between the free first and second edges, and
d) providing at least one of the at least one free cut edge with at least a first coupling profile, wherein the first coupling profile extends along an entire length of the respective free cut edge,
wherein step d) is performed by providing the first coupling profile as a separate part, which is subsequently attached along the entire length of the respective free cut edge, and
wherein the foam core bonds between the first and second skins to achieve the composite laminate.

* * * * *